United States Patent
Sato et al.

(10) Patent No.: US 6,728,064 B2
(45) Date of Patent: Apr. 27, 2004

(54) THIN-FILM MAGNETIC HEAD HAVING TWO MAGNETIC LAYERS, ONE OF WHICH INCLUDES A POLE PORTION LAYER AND A YOKE PORTION LAYER, AND METHOD OF MANUFACTURING SAME

(75) Inventors: Yoshikazu Sato, Tokyo (JP); Tetsuya Roppongi, Tokyo (JP); Yasuyuki Notsuke, Tokyo (JP)

(73) Assignee: TDK Corporation, Tokyo (JP)

( * ) Notice: Subject to any disclaimer, the term of this patent is extended or adjusted under 35 U.S.C. 154(b) by 119 days.

(21) Appl. No.: 10/097,566

(22) Filed: Mar. 15, 2002

(65) Prior Publication Data

US 2002/0135937 A1 Sep. 26, 2002

(30) Foreign Application Priority Data

Mar. 21, 2001 (JP) ........................................ 2001-081643

(51) Int. Cl.[7] .............................................. G11B 5/187
(52) U.S. Cl. ....................................................... 360/126
(58) Field of Search ................................ 360/125, 126, 360/317

(56) References Cited

U.S. PATENT DOCUMENTS

| | | | | | |
|---|---|---|---|---|---|
| 6,317,288 B1 | * | 11/2001 | Sasaki | ......................... | 360/126 |
| 6,317,289 B1 | * | 11/2001 | Sasaki | ......................... | 360/126 |
| 6,337,783 B1 | * | 1/2002 | Santini | ......................... | 360/317 |
| 6,369,984 B1 | * | 4/2002 | Sato | ......................... | 360/126 |
| 6,407,885 B1 | * | 6/2002 | Ahagon et al. | ............ | 360/126 |
| 6,483,664 B2 | * | 11/2002 | Kamijima | ................... | 360/126 |
| 6,490,125 B1 | * | 12/2002 | Barr | .......................... | 360/126 |

* cited by examiner

*Primary Examiner*—Jefferson Evans
(74) *Attorney, Agent, or Firm*—Oliff & Berridge, PLC

(57) ABSTRACT

A thin-film magnetic head comprises first and second magnetic layers, a gap layer provided between the first and second magnetic layers, and a thin-film coil at least a part of which is disposed between the first and second magnetic layers. The second magnetic layer has a pole portion layer, a yoke portion layer, and a coupling portion. The yoke portion layer is magnetically connected to the rear end surface of the pole portion layer and both side surfaces of the pole portion layer in the width direction. The rear end surface of the pole portion layer and the side surfaces of the pole portion layer in the width direction are each inclined relative to the direction perpendicular to the surface of the pole portion layer that faces the gap layer.

17 Claims, 22 Drawing Sheets

THIN-FILM MAGNETIC HEAD HAVING TWO MAGNETIC LAYERS, ONE OF WHICH INCLUDES A POLE PORTION LAYER AND A YOKE PORTION LAYER, AND METHOD OF MANUFACTURING SAME

BACKGROUND OF THE INVENTION

1. Field of the Invention

The present invention relates to a thin-film magnetic head having at least an induction-type electromagnetic transducer for writing, and to a method of manufacturing such a thin-film magnetic head.

2. Description of the Related Art

The recording schemes for a magnetic recording/reproducing apparatus include a longitudinal magnetic recording scheme which employs the direction of signal magnetization along the surface of the recording medium (or in the longitudinal direction) and a vertical magnetic recording scheme which employs the direction of signal magnetization perpendicular to the surface of the recording medium. When compared with the longitudinal magnetic recording scheme, the vertical magnetic recording scheme is said to be less affected by the thermal fluctuation of a recording medium and therefore possible to implement a higher linear recording density.

In general, the thin-film magnetic head that employs the longitudinal magnetic recording scheme comprises: a medium facing surface (or air bearing surface) that faces toward a recording medium; a first and a second magnetic layer magnetically coupled to each other at a position farther from the medium facing surface and including magnetic pole portions that are opposed to each other and placed in regions of the magnetic layers closer to the medium facing surface, with a gap layer provided between the magnetic pole portions; and a thin-film coil at least a part of which is placed between the first and the second magnetic layers and insulated from the first and second magnetic layers.

On the other hand, examples of the thin-film magnetic head that employs the vertical magnetic recording scheme include a ring head having the same structure as that of the thin-film magnetic head that employs the longitudinal magnetic recording scheme, and a single magnetic pole head for applying a magnetic field in a direction perpendicular to the surface of the recording medium with one main magnetic pole. Generally, for the single magnetic pole head, used as a recording medium is a two-layer medium that has a soft magnetic layer and a magnetic recording layer stacked on a substrate.

It has been desired to reduce the write track width of a recording medium to cope with a recent increase in recording density. Accordingly, it has also been desired to reduce the width of the main magnetic pole. However, as described below, there have been two problems which make it difficult to reduce the width of the main magnetic pole.

A first problem is that it is difficult to pattern the main magnetic pole with high accuracy, for example, in such a manner that the main magnetic pole is made to have a width of 0.5 $\mu$m or less. The main magnetic pole is formed by electroplating (frame plating), for example, using a resist frame that is formed by photolithography. Conventionally, the main magnetic pole is formed on a hill-like raised portion of an insulating layer that covers the coil, and therefore, the resist frame is formed on the insulating layer having great differences in height of irregularities. In this case, it is difficult to form the resist to have a uniform thickness, and accordingly it is difficult to pattern the resist frame with accuracy. This in turn makes it difficult to pattern the main magnetic pole with high accuracy.

A second problem is that a reduced width of the main magnetic pole makes it difficult to efficiently introduce a magnetic flux to the tip of the main magnetic pole, thereby weakening the magnetic field generated from the tip of the main magnetic pole in the medium facing surface.

To overcome these problems, thin-film magnetic heads for use with the longitudinal magnetic recording scheme often employ a structure in which one of magnetic layers is divided into a magnetic pole portion to be exposed in the medium facing surface and a yoke portion for introducing a magnetic flux into the magnetic pole portion.

Accordingly, it has been proposed for the single magnetic pole heads for use with the vertical magnetic recording scheme, too, to employ such a structure in which the main magnetic pole is divided into a magnetic pole portion to be exposed in the medium facing surface and a yoke portion for introducing a magnetic flux into the magnetic pole portion. This structure makes it possible to efficiently introduce the magnetic flux to the tip of the main magnetic pole by making the saturated magnetic flux density of the magnetic pole portion greater than that of the yoke portion, and to reduce the width of the magnetic pole portion.

For conventional thin-film magnetic heads for use with the longitudinal magnetic recording scheme, where they are configured such that one magnetic layer is divided into the magnetic pole portion and the yoke portion, in many cases the yoke portion is joined to only one of surfaces of the magnetic pole portion that is farther from the gap portion. However, this structure provides only a small area of the interface between the magnetic pole portion and the yoke portion, which causes the magnetic flux to be readily saturated at the interface. Therefore, this structure cannot meet the recent demand for enhancing magnetic fields for writing operations. To overcome this, thin-film magnetic heads having the following structure have been proposed in Published Unexamined Japanese Patent Application (KOKAI) No. Hei 11-102506, No. 2000-57522, No. 2000-67413 and No. 2000-149218. That is, the heads have a structure in which the yoke portion is joined to the magnetic pole portion not only at the surface of the magnetic pole portion farther from the gap portion but also at both side surfaces of the magnetic pole portion and at a surface of the magnetic pole portion farther from the medium facing surface.

For the single magnetic pole heads for use with the vertical magnetic recording scheme, where they are configured such that the main magnetic pole is divided into the magnetic pole portion and the yoke portion, it is conceivable to employ the structure in which the yoke portion is joined to the magnetic pole portion not only at the surface of the magnetic pole portion farther from the gap portion but also at the side surfaces of the magnetic pole portion and the surface of the magnetic pole portion farther from the medium facing surface, like the aforementioned heads for use with the longitudinal magnetic recording scheme.

For a head for use with the vertical magnetic recording scheme, it is important to increase the intensity of magnetic field in the direction perpendicular to the surface of the recording medium. However, even if the aforementioned structure is employed for the head for use with the vertical magnetic recording scheme, it is impossible to increase the intensity of the magnetic field in the direction perpendicular to the recording medium, because the areas of the interfaces between the yoke portion and the magnetic pole portion available at the surface of the magnetic pole portion farther from the medium facing surface and at the side surfaces of the magnetic pole portion are relatively small as compared with the area of the interface at the surface of the magnetic pole portion farther from the gap portion.

OBJECT AND SUMMARY OF THE INVENTION

It is therefore an object of the invention to provide a thin-film magnetic head which allows the magnetic pole portion to produce a greater magnetic field perpendicular to the surface of a recording medium and has an improved recording density, and a method of manufacturing such a thin-film magnetic head.

A thin-film magnetic head of the invention comprises: a medium facing surface that faces toward a recording medium; a first magnetic layer and a second magnetic layer that are magnetically coupled to each other at a distance from the medium facing surface, and include magnetic pole portions disposed to oppose to each other with a predetermined spacing interposed therebetween along the traveling direction of the recording medium; a gap layer made of a non-magnetic material and provided between the first and second magnetic layers; and a thin-film coil at least part of which is disposed between the first and second magnetic layers and insulated from the first and second magnetic layers.

In the thin-film magnetic head, the second magnetic layer has: a pole portion layer including the magnetic pole portion, the width of the pole portion layer measured in the medium facing surface defining a track width; and a yoke portion layer for magnetically connecting the pole portion layer and the first magnetic layer to each other.

The yoke portion layer is magnetically connected to the pole portion layer at least in part of: an end surface of the pole portion layer farther from the medium facing surface; and side surfaces of the pole portion layer in the width direction.

The pole portion layer has a connection surface that is magnetically connected to the yoke portion layer. The connection surface is at least part of: the end surface of the pole portion layer farther from the medium facing surface; and the side surfaces of the pole portion layer in the width direction. At least part of the connection surface is inclined relative to the direction perpendicular to a surface of the pole portion layer that faces the gap layer.

In the thin-film magnetic head of the invention, as described above, at least part of the connection surface of the pole portion layer is inclined relative to the direction perpendicular to the surface of the pole portion layer that faces the gap layer. This makes the connection surface larger in area as compared with the case where the connection surface is perpendicular to the surface of the pole portion layer that faces the gap layer. The magnetic flux is therefore efficiently introduced from the yoke portion layer into the pole portion layer through the connection surface. As a result, it is possible to increase the intensity of the magnetic field generated from the magnetic pole portion in the direction perpendicular to the surface of the recording medium.

In the thin-film magnetic head of the invention, the at least part of the connection surface may be inclined at an angle of more than 90° relative to the surface of the pole portion layer that faces the gap layer.

In the thin-film magnetic head of the invention, in a cross section containing the at least part of the connection surface, the yoke portion layer may be greater than the pole portion layer in thickness.

In the thin-film magnetic head of the invention, the yoke portion layer may be magnetically connected to the pole portion layer further at a surface of the pole portion layer farther from the gap layer. In this case, the thin-film magnetic head may further comprise a non-magnetic layer that touches the surface of the pole portion layer farther from the gap layer, and, the yoke portion layer may be adjacent to the surface of the pole portion layer farther from gap layer via the non-magnetic layer, and magnetically connected to the pole portion layer via the non-magnetic layer.

The thin-film magnetic head of the invention may further comprise a non-magnetic layer that touches the entirety of the surface of the pole portion layer farther from the gap layer. In this case, the vicinity of a part of a surface of the yoke portion layer farther from the gap layer, the part being magnetically connected to the pole portion layer at least in part of: the end surface of the pole portion layer farther from the medium facing surface; and the side surfaces of the pole portion layer in the width direction, may be flattened together with a surface of the non-magnetic layer farther from the gap layer.

In the thin-film magnetic head of the invention, the yoke portion layer may be magnetically connected to the pole portion layer further at the surface of the pole portion layer that faces the gap layer.

In the thin-film magnetic head of the invention, the pole portion layer may have a saturated magnetic flux density equal to or greater than that of the yoke portion layer.

The thin-film magnetic head of the invention may further comprise a magnetoresistive element as a read element.

The thin-film magnetic head of the invention may be employed for a vertical magnetic recording scheme.

The invention provides a method of manufacturing a thin-film magnetic head comprising: a medium facing surface that faces toward a recording medium; a first magnetic layer and a second magnetic layer that are magnetically coupled to each other at a distance from the medium facing surface, and include magnetic pole portions disposed to oppose to each other with a predetermined spacing interposed therebetween along the traveling direction of the recording medium; a gap layer made of a non-magnetic material and provided between the first and second magnetic layers; and a thin-film coil at least a part of which is disposed between the first and second magnetic layers and insulated from the first and second magnetic layers, wherein the second magnetic layer has: a pole portion layer including the magnetic pole portion, the width of the pole portion layer measured in the medium facing surface defining a track width; and a yoke portion layer for magnetically connecting the pole portion layer and the first magnetic layer to each other.

The method comprises the steps of: forming the first magnetic layer; forming the gap layer; forming the thin-film coil; and forming the second magnetic layer having the pole portion layer and the yoke portion layer.

The second magnetic layer is formed such that the yoke portion layer is magnetically connected to the pole portion layer at least in part of: an end surface of the pole portion layer farther from the medium facing surface; and side surfaces of the pole portion layer in the width direction, such that the pole portion layer has a connection surface that is magnetically connected to the yoke portion layer, the connection surface being at least part of the end surface of the pole portion layer farther from the medium facing surface and the side surfaces of the pole portion layer in the width direction, and such that at least part of the connection surface is inclined relative to the direction perpendicular to the surface of the pole portion layer that faces the gap layer.

According to the method of manufacturing the thin-film magnetic head of the invention, as described above, at least part of the connection surface of the pole portion layer is inclined relative to the direction perpendicular to the surface of the pole portion layer that faces the gap layer. This makes the connection surface larger in area as compared with the case where the connection surface is perpendicular to the surface of the pole portion layer that faces the gap layer. The magnetic flux is therefore efficiently introduced from the yoke portion layer into the pole portion layer through the connection surface. As a result, it is possible to increase the intensity of the magnetic field generated from the magnetic pole portion in the direction perpendicular to the surface of the recording medium.

In the method of the invention, the at least part of the connection surface may be inclined at an angle of more than 90° relative to the surface of the pole portion layer that faces the gap layer.

In the method of the invention, in a cross section containing the at least part of the connection surface, the yoke portion layer may be greater than the pole portion layer in thickness.

In the method of the invention, the yoke portion layer may be magnetically connected to the pole portion layer further at the surface of the pole portion layer farther from the gap layer. In this case, the method of the invention may further comprise the step of forming a non-magnetic layer that touches the surface of the pole portion layer farther from the gap layer, and, the yoke portion layer may be adjacent to the surface of the pole portion layer farther from the gap layer via the non-magnetic layer, and magnetically connected to the pole portion layer via the non-magnetic layer.

The method of the invention may further comprise the step of forming a non-magnetic layer that touches the surface of the pole portion layer farther from the gap layer. In this case, the step of forming the second magnetic layer may include, after the step of forming the non-magnetic layer, the steps of: forming at least a part of the yoke portion layer to be magnetically connected to the pole portion layer; forming a protective layer to cover the non-magnetic layer and the yoke portion layer; and polishing the protective layer to expose the non-magnetic layer, and then flattening the vicinity of a part of the surface of the yoke portion layer farther from the gap layer, the part being magnetically connected to the pole portion layer at least in part of: the end surface of the pole portion layer farther from the medium facing surface; and the side surfaces of the pole portion layer in the width direction, together with the surface of the non-magnetic layer farther from the gap layer.

In the method of the invention, the yoke portion layer may be magnetically connected to the pole portion layer further at the surface of the pole portion layer that faces the gap layer.

In the method of the invention, the pole portion layer may have a saturated magnetic flux density equal to or greater than that of the yoke portion layer.

Other and further objects, features and advantages of the invention will appear more fully from the following description.

DETAILED DESCRIPTION OF THE PREFERRED EMBODIMENTS

Embodiments of the invention will now be described in detail with reference to the accompanying drawings.

FIRST EMBODIMENT

Figure 1:
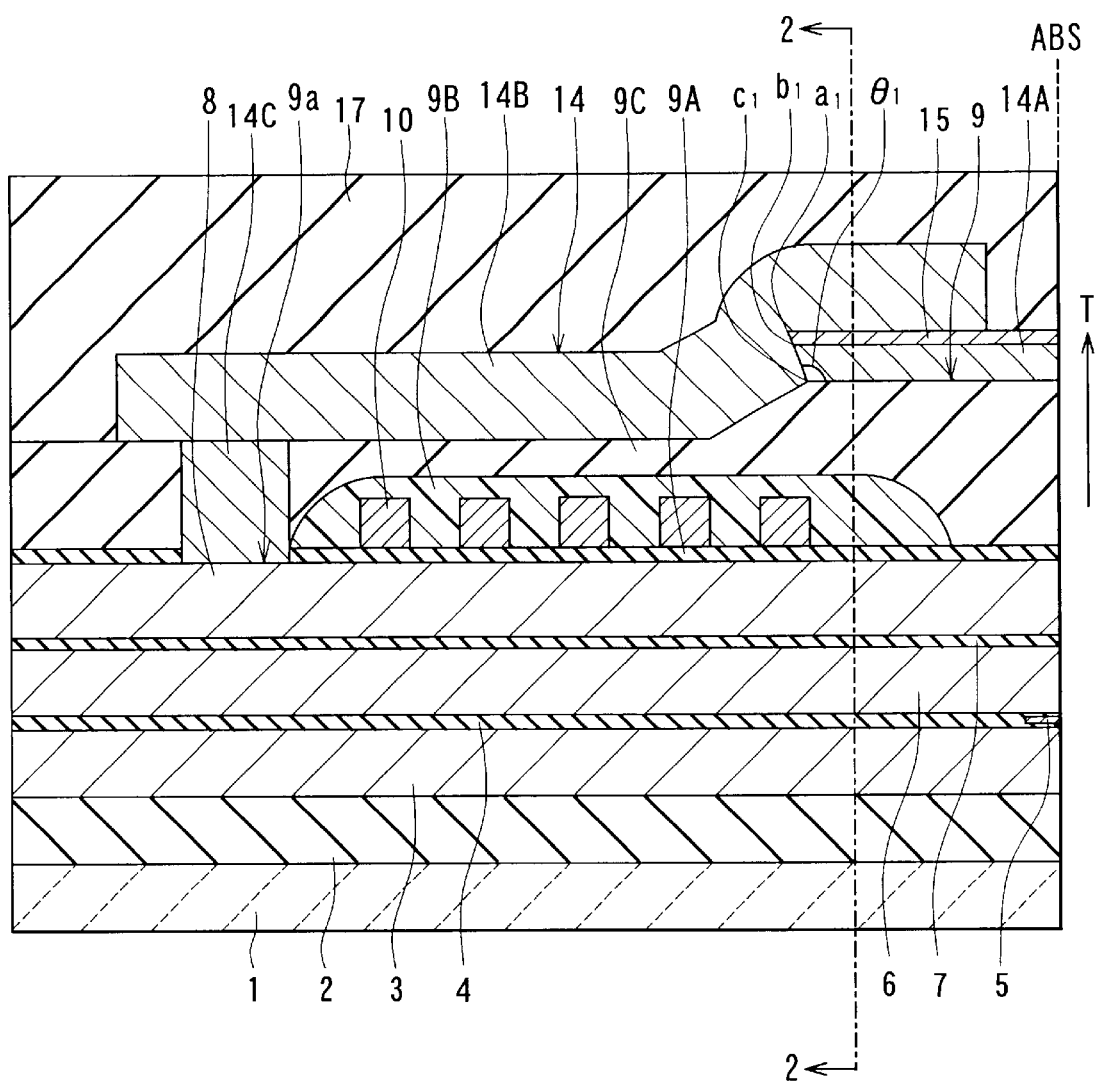
FIG. 1 is a cross-sectional view illustrating a structure of a thin-film magnetic head according to a first embodiment of the invention.
Figure 2:
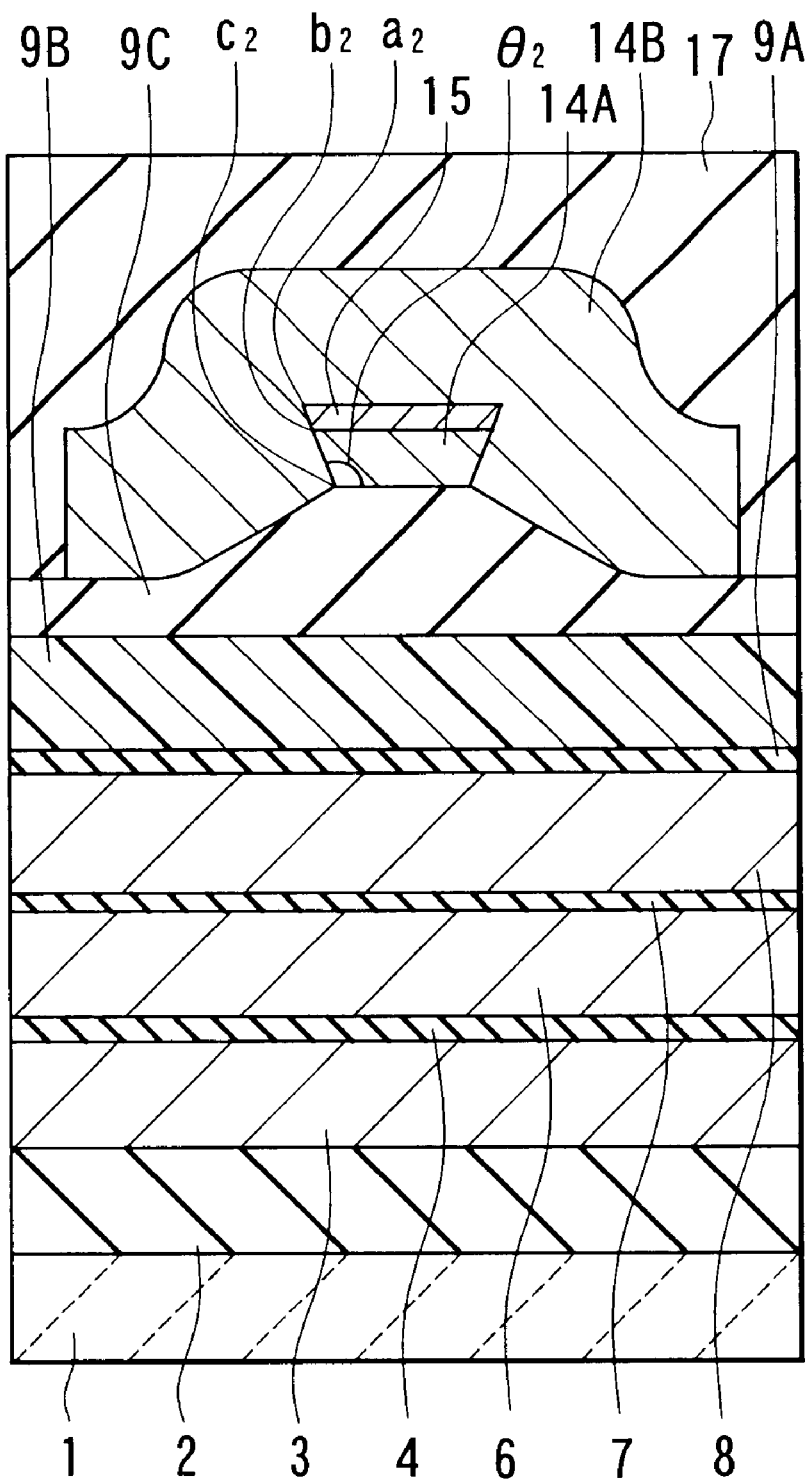
FIG. 2 is a cross-sectional view taken along line 2—2 of FIG. 1.
Figure 3:
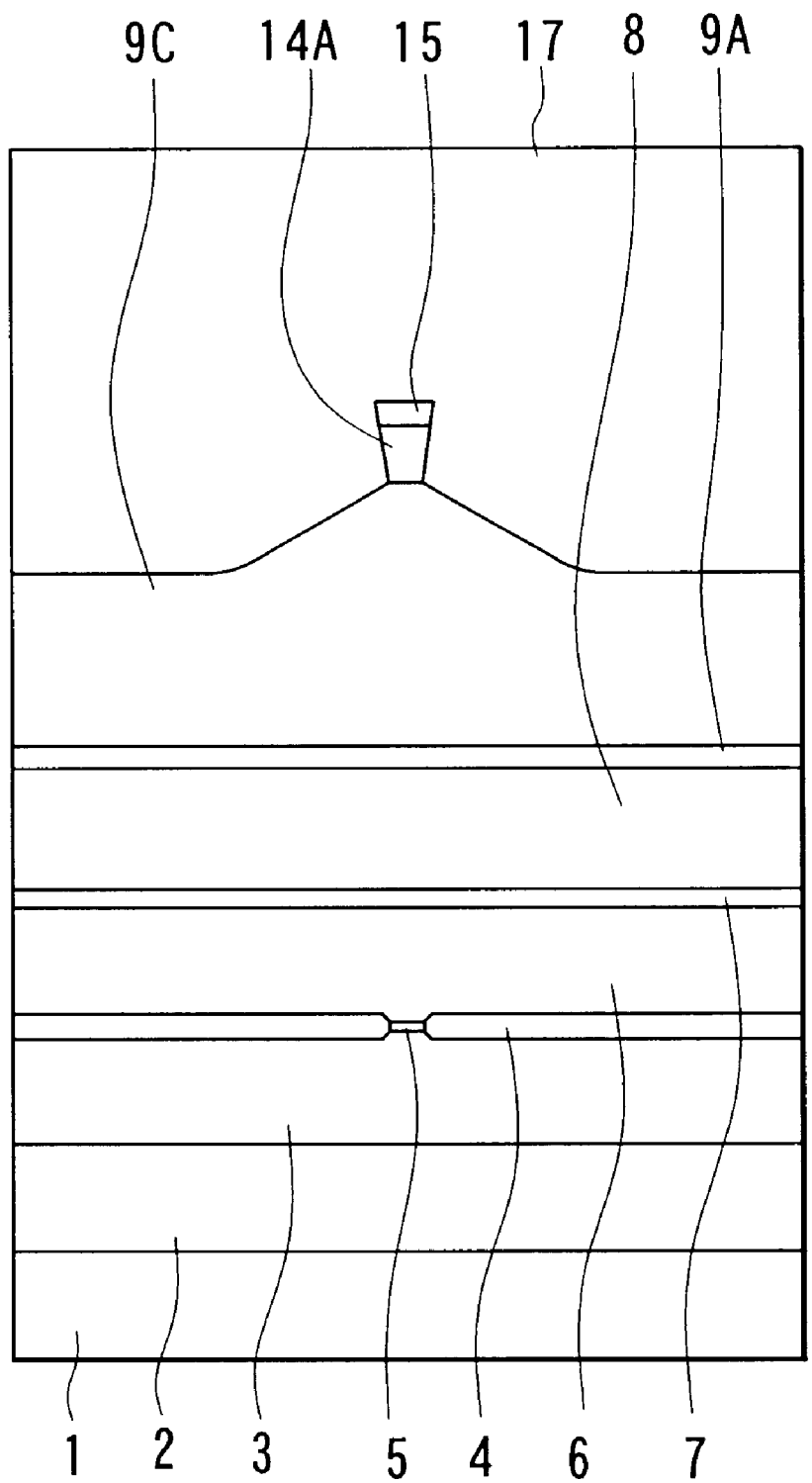
FIG. 3 is a front view illustrating the medium facing surface of the thin-film magnetic head shown in FIG. 1.
Figure 4:
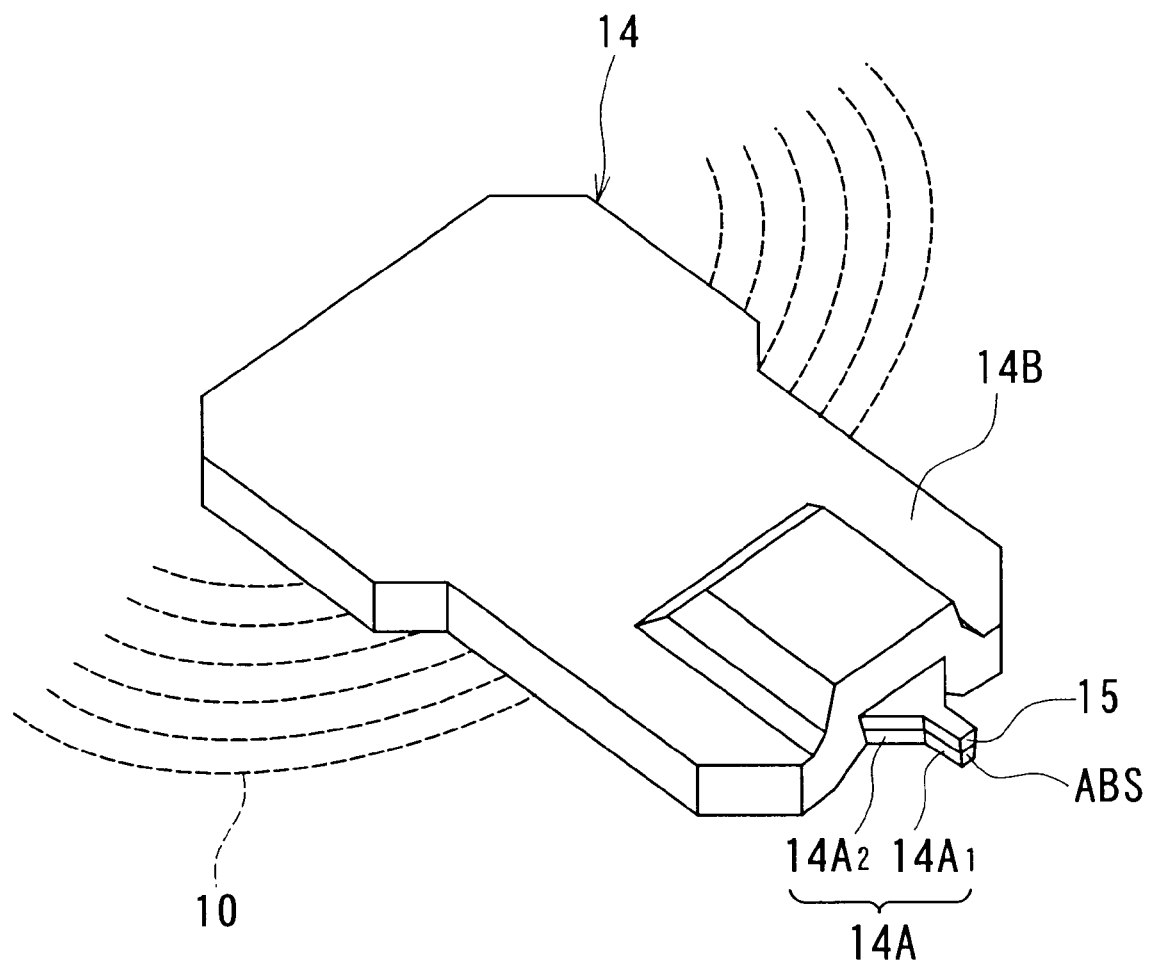
FIG. 4 is a perspective view illustrating the main part of the thin-film magnetic head shown in FIG. 1.

FIG. 1 is a cross-sectional view illustrating the structure of a thin-film magnetic head according to a first embodiment of the invention. FIG. 1 shows a cross section orthogonal to the medium facing surface and the surface of the substrate. The arrow indicated by symbol T in FIG. 1 shows the traveling direction of a recording medium. FIG. 2 is a cross-sectional view taken along line 2—2 of FIG. 1. FIG. 3 is a front view illustrating the medium facing surface of the thin-film magnetic head shown in FIG. 1. FIG. 4 is a perspective view illustrating the main part of the thin-film magnetic head shown in FIG. 1.

As shown in FIG. 1 and FIG. 2, the thin-film magnetic head of this embodiment comprises: a substrate 1 made of a ceramic material such as aluminum oxide and titanium carbide ($Al_2O_3 \cdot TiC$); an insulating layer 2 made of an insulating material such as alumina ($Al_2O_3$) and formed on the substrate 1; a bottom shield layer 3 made of a magnetic material and formed on the insulating layer 2; an MR (magnetoresistive) element 5 functioning as a read element and formed on the bottom shield layer 3 via an insulating layer 4; and a top shield layer 6 made of a magnetic material and formed on the MR element 5 via the insulating layer 4. Each of the bottom shield layer 3 and the top shield layer 6 has a thickness of, for example, 1 to 2 $\mu$m.

One of ends of the MR element 5 is located in the medium facing surface (air bearing surface) ABS. The MR element 5 may be an element made of a magnetosensitive film that exhibits a magnetoresistive effect, such as an anisotropic magnetoresistive (AMR) element, a giant magnetoresistive (GMR) element, or a tunneling magnetoresistive (TMR) element.

The thin-film magnetic head further comprises: a non-magnetic layer 7 formed on the top shield layer 6; a first magnetic layer 8 made of a magnetic material and formed on the non-magnetic layer 7; an insulating layer 9A formed on a portion of the first magnetic layer 8 in which a thin-film coil 10 is to be formed; the thin-film coil 10 formed on the insulating layer 9A; and an insulating layer 9B filled at least between windings of the thin-film coil 10. There is formed a contact hole 9a in the insulating layer 9A at a distance from the medium facing surface ABS.

For example, the first magnetic layer 8 has a thickness of 1 to 2 $\mu$m. The magnetic material for making the first magnetic layer 8 may be an iron-nickel-based alloy or Permalloy, or a high saturated magnetic flux density material to be described later. The first magnetic layer 8 may be made up of two layers or more.

The insulating layer 9A is made of a non-conductive and non-magnetic material such as alumina, and has a thickness of 0.1 to 1 $\mu$m, for example.

The thin-film coil 10 is made of a conductive material such as copper, and the winding thereof is 0.3 to 2 $\mu$m in thickness, for example. Thin-film coil 10 can have any number of turns of the winding as well as any pitch of the winding.

The insulating layer 9B is made of a non-conductive and non-magnetic material that exhibits fluidity during its formation. More specifically, the insulating layer 9B may be formed of an organic, non-conductive and non-magnetic material such as a photoresist (a photosensitive resin), or a spin-on-glass (SOG) film of coating glass.

The thin-film magnetic head further comprises: a coupling portion 14C made of a magnetic material and formed on a portion of the first magnetic layer 8 in which the contact hole 9a is formed; and an insulating layer 9C formed to cover the thin-film coil 10 and the insulating layers 9A and 9B. The coupling portion 14C makes a part of a second magnetic layer 14 to be described later. The thin-film coil 10 is wound around the coupling portion 14C.

For example, the coupling portion 14C has a thickness of 2 to 4 $\mu$m, a depth (or the length perpendicular to the medium facing surface ABS) of 2 to 10 $\mu$m, and a width of 5 to 20 $\mu$m. For example, the magnetic material making the coupling portion 14C may be an iron-nickel-based alloy or Permalloy, or a high saturated magnetic flux density material as described later.

The insulating layer 9C is made of a non-conductive and non-magnetic material which has a better resistance to corrosion, rigidity, and insulating strength than those of the insulating layer 9B. As such a material, an inorganic, non-conductive and non-magnetic material such as alumina and silicon dioxide ($SiO_2$) may be used. The total thickness of the insulating layers 9A and 9C in the medium facing surface ABS is, for example, 2 to 4 $\mu$m. This thickness should be equal to or greater than the thickness of the coupling portion 14C.

The insulating layers 9A, 9B and 9C make up a gap layer 9 that is provided between the first magnetic layer 8 and the second magnetic layer 14.

The thin-film magnetic head has the second magnetic layer 14 made of a magnetic material and formed on the insulating layer 9C. The second magnetic layer 14 has: the aforementioned coupling portion 14C; a pole portion layer 14A that includes a magnetic pole portion; and a yoke portion layer 14B that serves as a yoke portion and magnetically connects the pole portion layer 14A and the first magnetic layer 8 to each other via the coupling portion 14C. The pole portion layer 14A is formed on the insulating layer 9C to extend from the medium facing surface ABS to a predetermined position located between the medium facing surface ABS and the coupling portion 14C. The yoke portion layer 14B magnetically connects an end of the coupling portion 14C that is farther from the first magnetic layer 8 (hereinafter referred to as the upper end) and an end surface of the pole portion layer 14A that is farther from the medium facing surface ABS (hereinafter referred to as the rear end surface) to each other. The yoke portion layer 14B is shaped such that a magnetic path is formed inside the yoke portion layer 14B, the magnetic path connecting the upper end of the coupling portion 14C and the rear end surface of the pole portion layer 14A in the shortest distance. The thin-film magnetic head further comprises a non-magnetic layer 15 that is formed on the pole portion layer 14A. The non-magnetic layer 15 touches the entirety of a surface of the pole portion layer 14A that is farther from the gap layer 9. Part of the yoke portion layer 14B near the medium facing surface ABS is adjacent to the top surface of the pole portion layer 14A via the non-magnetic layer 15, and magnetically connected to part of the top surface of the pole portion layer 14A via the non-magnetic layer 15. The thin-film magnetic head further comprises a protective layer 17 made of a non-conductive and non-magnetic material such as alumina and formed to cover the second magnetic layer 14.

A surface of the thin-film coil 10 facing toward the second magnetic layer 14 is located closer to the first magnetic layer 8 than an end of the gap layer 9 is, the end being located in the medium facing surface ABS next to the second magnetic layer 14 (or the end of the insulating layer 9C closer to the second magnetic layer 14), and than the upper end of the coupling portion 14C is.

The pole portion layer 14A is preferably 0.1 to 0.8 μm in thickness and more preferably 0.3 to 0.8 μm. The length from the medium facing surface ABS to the rear end surface of the pole portion layer 14A is 2 μm or more.

As shown in FIG. 4, the pole portion layer 14A includes a first portion $14A_1$ located next to the medium facing surface ABS and a second portion $14A_2$ located farther from the medium facing surface ABS than the first portion $14A_1$. The first portion $14A_1$ is the magnetic pole portion of the second magnetic layer 14. The magnetic pole portion of the first magnetic layer 8 includes a portion of the first magnetic layer 8 that is opposed to the first portion $14A_1$ via the gap layer 9.

The first portion $14A_1$ has a width equal to the track width. That is, the width of the first portion $14A_1$ in the medium facing surface ABS defines the track width. The second portion $14A_2$ has a width equal to that of the first portion $14A_1$ at the interface with the first portion $14A_1$. The width of the second portion $14A_2$ gradually increases from this interface with an increase in distance from the medium facing surface ABS, and finally becomes constant. The part of the yoke portion layer 14B near the medium facing surface ABS is laid over the second portion $14A_2$ of the pole portion layer 14A via the non-magnetic layer 15.

The width of the first portion $14A_1$ in the medium facing surface ABS, that is, the track width, is preferably 0.5 μm or less, and more preferably 0.3 μm or less. The portion of the second portion $14A_2$ overlapping the yoke portion layer 14B has a width of 2 μm or more, for example, which is greater than the width of the first portion $14A_1$ measured in the medium facing surface ABS.

For example, the yoke portion layer 14B has a thickness of 1 to 2 μm. The yoke portion layer 14B is magnetically connected to the rear end surface of the pole portion layer 14A as shown in FIG. 1, while being magnetically connected to both side surfaces of the pole portion layer 14A in the width direction, as shown in FIG. 2. Thus, in the embodiment, the rear end surface of the pole portion layer 14A and the side surfaces of the pole portion layer 14A in the width direction correspond to the connection surface in the invention. The end of the yoke portion layer 14B closer to the medium facing surface ABS is located at a distance of 1.5 μm or more, for example, from the medium facing surface ABS.

The pole portion layer 14A has a saturated magnetic flux density equal to or greater than that of the yoke portion layer 14B. As a magnetic material to form the pole portion layer 14A, it is preferable to use a high saturated magnetic flux density material having a saturated magnetic flux density of 1.4 T or more. High saturated magnetic flux density materials usable here include, for example, a material containing iron and nitrogen atoms, a material containing iron, zirconia and oxygen atoms, and a material containing iron and nickel elements. More specifically, for example, as a high saturated magnetic flux density material it is possible to use at least one of NiFe (Ni: 45 wt %, Fe: 55 wt %), FeN and its compounds, Co-based amorphous alloys, Fe—Co, Fe—M (including oxygen atoms as required), and Fe—Co—M (including oxygen atoms as required). In the foregoing, M is at least one element selected from the group consisting of Ni, N, C, B, Si, Al, Ti, Zr, Hf, Mo, Ta, Nb, and Cu (all of which stand for chemical elements).

As a magnetic material to form the yoke portion layer 14B, it is possible to use a material containing iron and nickel elements and having a saturated magnetic flux density of the order of 1.0 T, for example. Such a material has a good resistance to corrosion and a higher resistance than that of the material to form the pole portion layer 14A. Use of such a material will facilitate formation of the yoke portion layer 14B.

To form the yoke portion layer 14B, it is also possible to use a magnetic material that is the same in compositional family as the magnetic material used to form the pole portion layer 14A. In this case, to make the saturated magnetic flux density of the yoke portion layer 14B lower than that of the pole portion layer 14A, it is preferable to use, to form the yoke portion layer 14B, a magnetic material having a lower compositional ratio of iron atoms than that of the magnetic material used to form the pole portion layer 14A.

The non-magnetic layer 15 is identical to the pole portion layer 14A in planar shape. The non-magnetic layer 15 is exposed in the medium facing surface ABS. The non-magnetic layer 15 preferably has a thickness of 0.5 μm or less. It is also possible to omit the non-magnetic layer 15.

The non-magnetic layer 15 may be formed of, for example, a material containing titanium or tantalum (including their alloys and oxides), or an inorganic, non-conductive and non-magnetic material such as alumina or silicon dioxide ($SiO_2$). If dry etching is used to form the pole portion layer 14A, it is preferable that the non-magnetic layer 15 is formed of a material having a lower etching rate for the dry etching than that of the material to form the pole portion layer 14A. For this purpose, a material containing titanium or tantalum (including their alloys and oxides) may be used, for example.

As shown in FIG. 3, it is preferable that the surface of the pole portion layer 14A exposed in the medium facing surface ABS preferably has a shape of a trapezoid or triangle in which the lower side located on the trailing side in the traveling direction T of the recording medium (or on the air-inflow-end side of the slider) is shorter than the upper side. The side surfaces of the pole portion layer 14A may be concave. It is also preferable that the sides of the surface of the pole portion layer 14A exposed in the medium facing surface ABS each form an angle of 92° to 110° with the surface of the pole portion layer 14A that faces the gap layer 9.

As described above, the thin-film magnetic head according to this embodiment comprises the medium facing surface ABS that faces toward the recording medium, a read head, and a write head (induction-type electromagnetic transducer). The read head comprises the MR element 5 functioning as a read element, and the bottom shield layer 3 and the top shield layer 6 for magnetically shielding the MR element 5. The bottom and top shield layers 3 and 6 have portions that are located on a side of the medium facing surface ABS and opposed to each other with the MR element 5 interposed therebetween.

The write head comprises: the first magnetic layer 8 and the second magnetic layer 14 that are magnetically coupled to each other at a distance from the medium facing surface ABS, and include magnetic pole portions disposed on a side of the medium facing surface ABS and opposed to each other with a predetermined spacing interposed therebetween along the traveling direction T of the recording medium; the gap layer 9 made of a non-magnetic material and provided between the first and second magnetic layers 8 and 14; and the thin-film coil 10 at least part of which is disposed between the first and second magnetic layers 8 and 14 and insulated from the first and second magnetic layers 8 and 14.

The second magnetic layer 14 has: the pole portion layer 14A including the magnetic pole portion, the width of the pole portion layer 14A measured in the medium facing surface ABS defining a track width; the yoke portion layer 14B that serves as a yoke portion and magnetically connects the pole portion layer 14A and the first magnetic layer 8 to each other via the coupling portion 14C; and the coupling portion 14C. The yoke portion layer 14B is magnetically connected to the rear end surface of the pole portion layer 14A and the side surfaces of the pole portion layer 14A in the width direction. The pole portion layer 14A has a saturated magnetic flux density equal to or greater than that of the yoke portion layer 14B.

According to this embodiment, since the second magnetic layer 14 has the pole portion layer 14A and the yoke portion layer 14B, it is possible to reduce the track width without decreasing the intensity of the magnetic field to be applied to the recording medium.

In this embodiment, as shown in FIG. 1, the rear end surface of the pole portion layer 14A is inclined relative to the direction perpendicular to the surface of the pole portion layer 14A that faces the gap layer 9. That is, theoretically, the rear end surface of the pole portion layer 14A forms an angle $\theta_1$ that falls within a range including the ranges of $0°<\theta_1<90°$ and $90°<\theta_1<180°$ with the surface of the pole portion layer 14A that faces the gap layer 9. It is preferable that the rear end surface of the pole portion layer 14A is inclined at an angle of more than 90° relative to the surface of the pole portion layer 14A that faces the gap layer 9. In other words, the angle $\theta_1$ preferably falls within the range of $90°<\theta_1<180°$. More preferably, the angle $\theta_1$ falls within the range of 92° to 110°.

Figure 5:
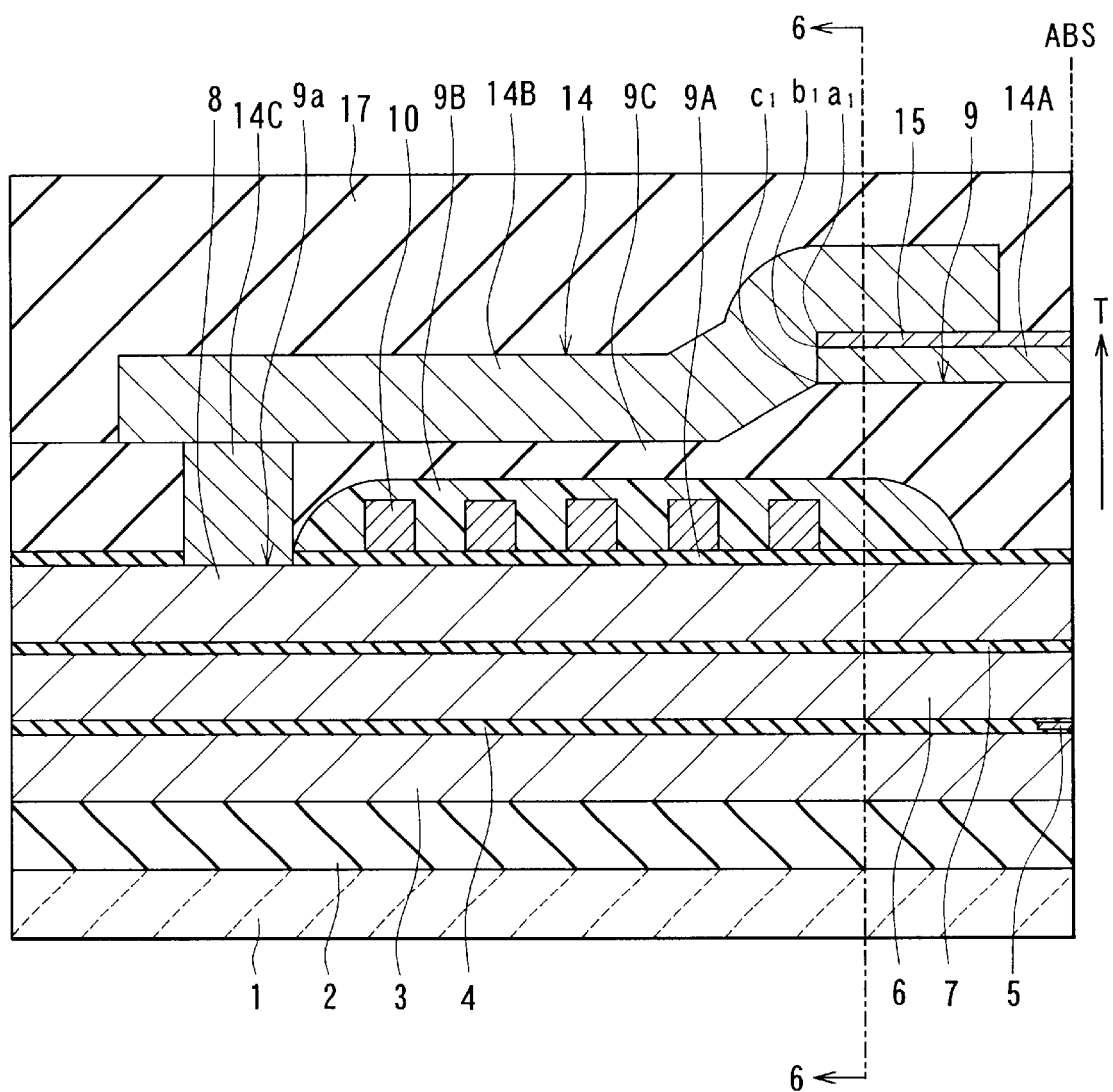
FIG. 5 is a cross-sectional view illustrating a structure of a thin-film magnetic head of a comparative example.
Figure 6:
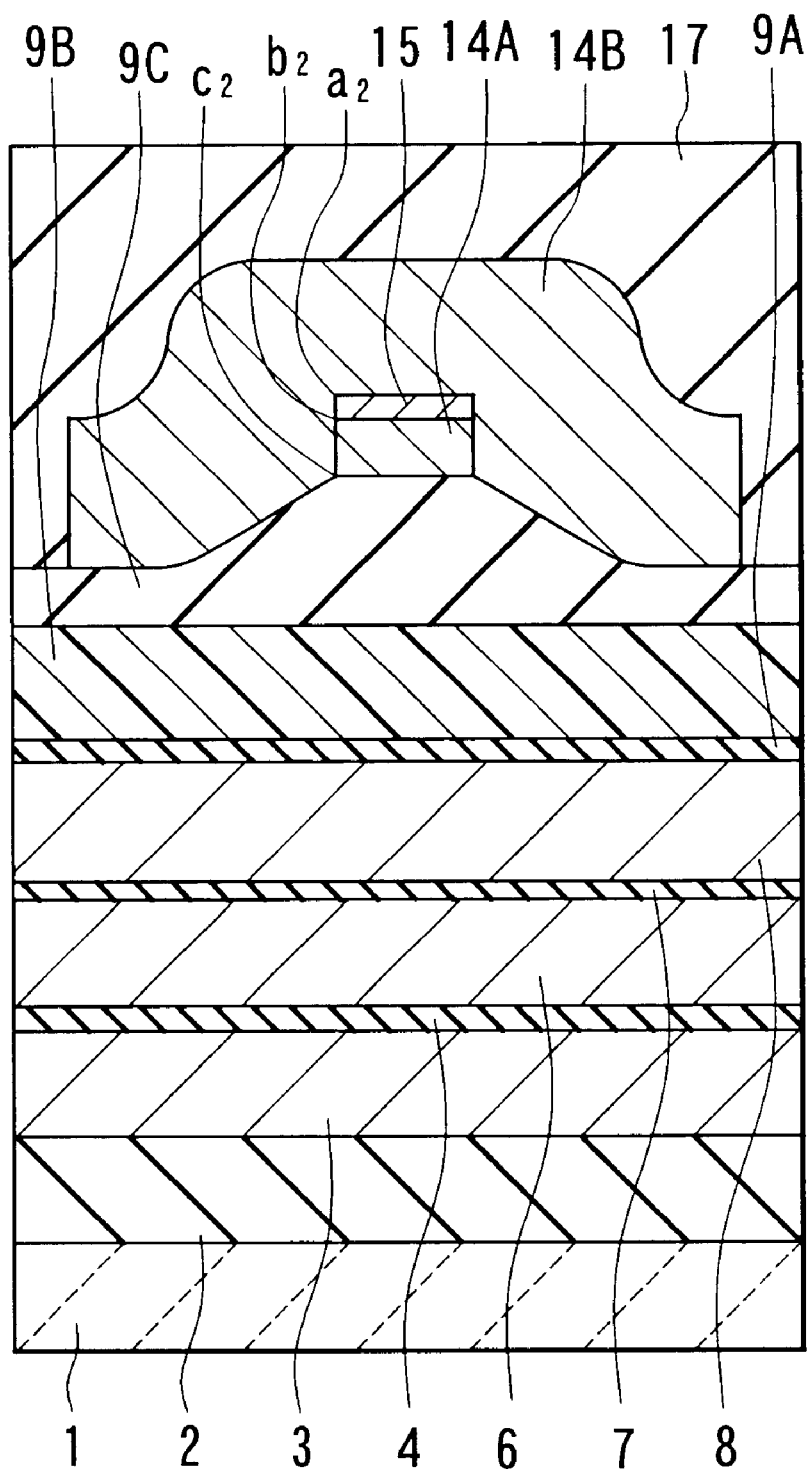
FIG. 6 is a cross-sectional view taken along line 6—6 of FIG. 5.

Now, described below are advantageous effects resulting from the inclination of the rear end surface of the pole portion layer 14A relative to the direction perpendicular to the surface of the pole portion layer 14A that faces the gap layer 9. First, a comparative example is provided for comparison with the thin-film magnetic head of this embodiment. FIG. 5 is a cross-sectional view illustrating the structure of a thin-film magnetic head of the comparative example. FIG. 6 is a cross-sectional view taken along line 6—6 of FIG. 5. The thin-film magnetic head of the comparative example has the same structure as that of the head of this embodiment except that the rear end surface of the pole portion layer 14A and the side surfaces of the pole portion layer 14A in the width direction are each perpendicular to the surface of the pole portion layer 14A that faces the gap layer 9.

Here, in the cross sections shown in FIG. 1 and FIG. 5, $a_1$ is a point at which the rear end surface of the non-magnetic layer 15 intersects the surface of the non-magnetic layer 15 farther from the pole portion layer 14A; $b_1$ is a point at which the rear end surface of the pole portion layer 14A intersects the surface of the pole portion layer 14A that faces the non-magnetic layer 15; and $c_1$ is a point at which the rear end surface of the pole portion layer 14A intersects the surface of the pole portion layer 14A that faces the gap layer 9.

For the thin-film magnetic head of the comparative example shown in FIG. 5, the length of the line segment $b_1c_1$ is equal to thickness d of the pole portion layer 14A. On the other hand, for the thin-film magnetic head of this embodiment shown in FIG. 1, the length of the line segment $b_1c_1$ is expressed by the following equation (1) using the thickness d of the pole portion layer 14A and the aforementioned angle $\theta_1$:

$$b_1c_1 = d/|\sin\theta_1| \qquad (1)$$

Since the term $|\sin\theta_1|$ is less than one, the length of the line segment $b_1c_1$ for this embodiment is greater than that for the comparative example. That is, this embodiment achieves a greater area of the portion at which the pole portion layer 14A and the yoke portion layer 14B are magnetically connected to each other in the rear end surface of the pole portion layer 14A, as compared with the comparative example. As the term $|\sin\theta_1|$ becomes smaller, the length of the line segment $b_1c_1$ becomes greater, that is, the portion at which the pole portion layer 14A and the yoke portion layer 14B are magnetically connected to each other in the rear end surface of the pole portion layer 14A becomes greater in area. Thus, according to this embodiment it is possible to efficiently introduce a magnetic flux from the yoke portion layer 14B to the pole portion layer 14A through the rear end surface of the pole portion layer 14A. As a result, it is possible to increase the intensity of a magnetic field in the direction perpendicular to the surface of the recording medium, generated from the medium-facing-surface-side end of the pole portion layer 14A.

If the rear end surface of the pole portion layer 14A is inclined at an angle of more than 90° relative to the surface of the pole portion layer 14A that faces the gap layer 9, a greater area is achieved for the portion at which the pole portion layer 14A and the yoke portion layer 14B are magnetically connected to each other in the surface of the pole portion layer 14A farther from the gap layer 9. This makes it possible to efficiently introduce the magnetic flux from the yoke portion layer 14B to the pole portion layer 14A.

In this embodiment, as shown in FIG. 2, the side surfaces of the pole portion layer 14A in the width direction are also inclined relative to the direction perpendicular to the surface of the pole portion layer 14A that faces the gap layer 9, like the rear end surface thereof. That is, theoretically, the side surfaces of the pole portion layer 14A in the width direction each form an angle $\theta_2$ that falls within a range including the ranges of $0°<\theta_2<90°$ and $90°<\theta_2<180°$ with the surface of the pole portion layer 14A that faces the gap layer 9. It is preferable that the side surfaces of the pole portion layer 14A in the width direction are each inclined at an angle of more than 90° relative to the surface of the pole portion layer 14A that faces the gap layer 9. In other words, the angle $\theta_2$ preferably falls within the range of $90°<\theta_2<180°$. More preferably, the angle $\theta_2$ falls within the range of 92° to 110°.

Here, in the cross sections shown in FIG. 2 and FIG. 6, $a_2$ is a point at which a side surface of the non-magnetic layer 15 intersects the surface of the non-magnetic layer 15 farther from the pole portion layer 14A; $b_2$ is a point at which a side surface of the pole portion layer 14A intersects the surface of the pole portion layer 14A that faces the non-magnetic layer 15; and $c_2$ is a point at which the side surface of the pole portion layer 14A intersects the surface of the pole portion layer 14A that faces the gap layer 9. The length of the line segment $b_2c_2$ is expressed by the following equation (2) using the thickness d of the pole portion layer 14A and the aforementioned angle $\theta_2$:

$$b_2c_2 = d/|\sin\theta_2| \qquad (2)$$

Therefore, the length of the line segment $b_2c_2$ for this embodiment is greater than that for the comparative example. That is, as compared with the comparative example, this embodiment achieves greater areas of portions at which the pole portion layer 14A and the yoke portion layer 14B are magnetically connected to each other in the side surfaces of the pole portion layer 14A in the width direction. As the term $|\sin\theta_2|$ becomes smaller, the length of the line segment $b_2c_2$ becomes greater, that is, the portions at which the pole portion layer 14A and the yoke portion layer 14B are magnetically connected to each other in the side surfaces of the pole portion layer 14A become greater in area. Thus, according to this embodiment it is possible to efficiently introduce the magnetic flux from the yoke portion layer 14B to the pole portion layer 14A through the side surfaces of the pole portion layer 14A. As a result, it is possible to increase the intensity of the magnetic field in the direction perpendicular to the surface of the recording medium, generated from the medium-facing-surface-side end of the pole portion layer 14A.

In the thin-film magnetic head according to this embodiment, it is preferable that the surface of the pole portion layer 14A exposed in the medium facing surface ABS preferably has a shape of a trapezoid or triangle in which the lower side located on the trailing side in the traveling direction T of the recording medium (or on the air-inflow-end side of the slider) is shorter than the upper side. The side surfaces of the pole portion layer 14A may be concave. If the thin-film magnetic head in which the surface of the pole portion layer 14A exposed in the medium facing surface ABS has a shape of the trapezoid or triangle as mentioned above is employed for the vertical magnetic recording scheme, it is possible to prevent a variation in write track width when a skew angle is developed. If the head is employed for the longitudinal magnetic recording scheme, it is possible to reduce the track width to a greater extent. In the surface of the pole portion layer 14A exposed in the medium facing surface ABS, it is more preferable that the sides of the pole portion layer 14A in the width direction each form an angle of 92° to 110° with the gap-layer-9-facing side of the pole portion layer 14A.

In this embodiment, the yoke portion layer 14B is greater in thickness than the pole portion layer 14A in the cross section containing the rear end surface of the pole portion layer 14A and the side surfaces of the pole portion layer 14A in the width direction that are magnetically connected to the yoke portion layer 14B. This makes it possible to prevent the magnetic flux from being saturated in the yoke portion layer 14B in the vicinity of the portion at which the pole portion layer 14A and the yoke portion layer 14B are connected to each other. As a result, it is possible to efficiently introduce the magnetic flux from the yoke portion layer 14B to the pole portion layer 14A, and it is thereby possible to increase the intensity of the magnetic field in the direction perpendicular to the surface of the recording medium, generated from the medium-facing-surface-side end of the pole portion layer 14A.

To prevent saturation of the magnetic flux in the yoke portion layer 14B, it is preferable to satisfy the relationship given by the following equation (3):

$$T_Y/T_P > B_{SP}/B_{SY} \quad (3)$$

where $T_y$ is the thickness of the yoke portion layer 14B measured in the portion at which the pole portion layer 14A and the yoke portion layer 14B are magnetically connected to each other in the rear end surface of the pole portion layer 14A and the side surfaces of the pole portion layer 14A in the width direction; $T_P$ is the thickness of the pole portion layer 14A measured in the above-mentioned portion; $B_{SY}$ is the saturated magnetic flux density of the yoke portion layer 14B; and $B_{SP}$ is the saturated magnetic flux density of the pole portion layer 14A.

The thin-film magnetic head of this embodiment is suitable for the vertical magnetic recording scheme. When this thin-film magnetic head is used for the vertical magnetic recording scheme, the first portion $14A_1$ of the pole portion layer 14A of the second magnetic layer 14 serves as a main magnetic pole, while the magnetic pole portion of the first magnetic layer 8 serves as an auxiliary magnetic pole. When the thin-film magnetic head of this embodiment is used for the vertical magnetic recording scheme, it is possible to employ either of a two-layered recording medium and a single-layered recording medium.

In the thin-film magnetic head of this embodiment, the second magnetic layer 14 has the pole portion layer 14A and the yoke portion layer 14B. The yoke portion layer 14B has a sufficient volume to introduce a magnetic flux into the pole portion layer 14A, and the pole portion layer 14A has a saturated magnetic flux density equal to or greater than that of the yoke portion layer 14B. Accordingly, it is possible to prevent the magnetic flux from being saturated halfway through the second magnetic layer 14.

Furthermore, in this embodiment, part of the thin-film coil 10 is disposed between the magnetic layers 8 and 14, and the surface of that part of the coil facing toward the second magnetic layer 14 is located closer to the first magnetic layer 8 than the end of the gap layer 9 located in the medium facing surface ABS next to the second magnetic layer 14, and also than the upper end of the coupling portion 14C. In addition, the yoke portion layer 14B magnetically connects the upper end of the coupling portion 14C and the rear end surface of the pole portion layer 14A to each other. Accordingly, the yoke portion layer 14B forms a strong magnetic coupling between the coupling portion 14C and the pole portion layer 14A in a short magnetic path.

With the features as described in the foregoing, this embodiment can increase the intensity of the magnetic field generated from the magnetic pole portion of the second magnetic layer 14 in the direction perpendicular to the surface of the recording medium, and reduce the magnetic path length, thereby improving the high-frequency characteristics. When the pole portion layer 14A is formed of a high saturated magnetic flux density material, it is possible to especially increase the intensity of the magnetic field in the direction perpendicular to the surface of the recording medium, and it is thereby possible to write data on a recording medium having an enhanced coercivity.

Furthermore, for the thin-film magnetic head of this embodiment, the magnetic field produced in the direction perpendicular to the surface of the recording medium is greater than a magnetic field in the longitudinal direction. Therefore, the magnetic energy produced by the head is efficiently transferred to the recording medium. Accordingly, this thin-film magnetic head can be made impervious to heat fluctuations of the recording medium, which serves to increase the linear write density.

In the thin-film magnetic head of this embodiment, as shown in FIG. 1, it is preferable to dispose the first magnetic layer 8 on the trailing side in the traveling direction T of the recording medium (or on the air-inflow-end side of the slider including the thin-film magnetic head), and to dispose the second magnetic layer 14 on the leading side in the traveling direction T of the recording medium (or on the air-outflow-end side of the slider including the thin-film magnetic head). However, when the thin-film magnetic head of this embodiment is employed for the vertical magnetic recording scheme, the first magnetic layer 8 and the second magnetic layer 14 may be disposed in a manner reverse to that mentioned above.

In the thin-film magnetic head of this embodiment, as shown in FIG. 1, the yoke portion layer 14B of the second magnetic layer 14 is shaped such that a magnetic path if formed inside the yoke portion layer 14B, the magnetic path connecting the upper end of the coupling portion 14C and the rear end surface of the pole portion layer 14A in the shortest distance. This serves to reduce the magnetic path length especially, and to thereby improve the high-frequency characteristics.

In the thin-film magnetic head of this embodiment, as shown in FIG. 1, the distance between the pole portion layer 14A and the first magnetic layer 8 measured in the medium facing surface ABS is equal to or greater than the thickness of the coupling portion 14C. The yoke portion layer 14B gradually approaches the first magnetic layer 8 over a region extending from the portion thereof connected to the rear end surface of the pole portion layer 14A to the portion thereof connected to the coupling portion 14C. It is thereby possible to especially reduce the magnetic path length and to thereby improve the high-frequency characteristics.

In the thin-film magnetic head of this embodiment, as shown in FIG. 1, at least part of the yoke portion layer 14B is shaped like an arc protruding toward the first magnetic layer 8. This causes part of the yoke portion layer 14B to stay closer to the thin-film coil 10, thereby allowing the magnetic field generated by the thin-film coil 10 to be absorbed efficiently by the yoke portion layer 14B.

In the thin-film magnetic head of this embodiment, as shown in FIG. 3, the yoke portion layer 14B is magnetically connected to the rear end surface of the pole portion layer 14A and the side surfaces of the pole portion layer 14A in the width direction. It is thereby possible to achieve a greater area of the portion at which the yoke portion layer 14B and the pole portion layer 14A are connected to each other, even if the pole portion layer 14A is small in volume. This serves to prevent saturation of the magnetic flux at this portion. Consequently, it is possible to efficiently introduce the magnetic flux from the yoke portion layer 14B into the pole portion layer 14A, and to thereby increase the intensity of magnetic field applied to the recording medium.

In the thin-film magnetic head of this embodiment, as shown in FIG. 1, the end of the yoke portion layer 14B closer to the medium facing surface ABS is located at a distance from the medium facing surface ABS. It is thereby possible to prevent the magnetic field that is produced from the this end of the yoke portion layer 14B from causing writing of data onto the recording medium.

In the thin-film magnetic head of this embodiment, as shown in FIG. 4, the portion of the pole portion layer 14A touching the yoke portion layer 14B has a width greater than the width of the pole portion layer 14A measured in the medium facing surface ABS. This allows the portion of the pole portion layer 14A touching the yoke portion layer 14B to be greater in area, and thereby makes it possible to prevent saturation of the magnetic flux at this portion. Consequently, it is possible to efficiently introduce the magnetic flux from the yoke portion layer 14B into the pole portion layer 14A. On the other hand, by making the portion of the pole portion layer 14A exposed in the medium facing surface ABS smaller in area, it is possible to increase the intensity of the magnetic field to be applied to the recording medium.

In the thin-film magnetic head of this embodiment, the length from the medium facing surface ABS to the rear end surface of the pole portion layer 14A is 2 $\mu$m or more. This serves to attain a large area of the portion of the pole portion layer 14A that touches the yoke portion layer 14B, without increasing the thickness or width of the pole portion layer 14A. Saturation of the magnetic flux at this portion is thereby prevented. Consequently, it is possible to introduce the magnetic flux efficiently from the yoke portion layer 14B into the pole portion layer 14A.

As shown in FIG. 1, the thin-film magnetic head of this embodiment has the non-magnetic layer 15 that touches the entirety of the surface of the pole portion layer 14A farther from the gap layer 9. Without the non-magnetic layer 15, the surface of the pole portion layer 14A farther from the gap layer 9 would be damaged when forming the pole portion layer 14A by dry etching or when forming the yoke portion layer 14B by electroplating, which would result in surface irregularities of the order of, for example, 0.1 to 0.3 $\mu$m on this surface. Since the head of this embodiment is provided with the non-magnetic layer 15, it is possible to prevent the surface of the pole portion layer 14A farther from the gap layer 9 from being damaged when forming the pole portion layer 14A by dry etching or when forming the yoke portion layer 14B by electroplating, and it is thereby possible to make the surface flat. In particular, providing the non-magnetic layer 15 serves to protect the edges (including the point $b_1$ of FIG. 1 and the point $b_2$ of FIG. 2) at which the rear end surface of the pole portion layer 14A and the side surfaces of the pole portion layer 14A in the width direction intersect the surface of the pole portion layer 14A that faces the non-magnetic layer 15. It is also possible to attain a sufficiently large area of the portion at which the pole portion layer 14A and the yoke portion layer 14B are magnetically connected to each other in the rear end surface of the pole portion layer 14A and the side surfaces of the pole portion layer 14A in the width direction. Furthermore, since the non-magnetic layer 15 is exposed in the medium facing surface ABS, the end of the pole portion layer 14A farther from the gap layer 9 can be kept flat in the medium facing surface ABS. The magnetic field generated by the pole portion layer 14A in the medium facing surface ABS is thereby allowed to be uniform in the direction intersecting the track. Consequently, it is possible to prevent the bit pattern of the recording medium from being distorted in shape, and to thereby improve the linear recording density.

In this embodiment, part of the yoke portion layer 14B near the medium facing surface ABS is adjacent to the surface of the pole portion layer 14A farther from the gap layer 9 via the non-magnetic layer 15, and magnetically connected to the pole portion layer 14A via the non-magnetic layer 15. Consequently, it is possible to introduce a magnetic flux from the yoke portion layer 14B to the medium-facing-surface-ABS side of the pole portion layer 14A via the non-magnetic layer 15, through the surface of the pole portion layer 14A farther from the gap layer 9, too.

If the non-magnetic layer 15 is formed of a material having a less etching rate than that of the material forming the pole portion layer 14A, it is possible to prevent the surface of the pole portion layer 14A farther from the gap layer 9 from being damaged when forming the pole portion layer 14A by dry etching.

In the thin-film magnetic head of this embodiment, as shown in FIG. 1, part of the thin-film coil 10 is disposed between the first and second magnetic layers 8 and 14, and the part of the coil is located closer to the first magnetic layer 8 than the midpoint between the first and second magnetic layers 8 and 14. This arrangement allows the first magnetic layer 8 that is larger in volume than the second magnetic layer 14 to efficiently absorb the magnetic field produced by the thin-film coil 10. It is thereby possible to increase the absorptivity of the magnetic field in the first and second magnetic layers 8 and 14 as compared with the case where the thin-film coil 10 is located closer to the second magnetic layer 14.

In the thin-film magnetic head of this embodiment, as shown in FIG. 1, the gap layer 9 comprises: a first portion (the insulating layer 9B) that is made of a material Hexhibiting fluidity during its formation and is filled at least in between the windings of the thin-film coil 10; and a second portion (the insulating layers 9A, 9C) made of a material having a better resistance to corrosion, rigidity, and insulation property than those of the first portion. The second portion covers the thin-film coil 10 and the first portion, and touches the first magnetic layer 8 and the second magnetic layer 14. The second portion of the gap layer 9 is exposed in the medium facing surface ABS. Although it is difficult to completely fill in the spaces between the windings of the thin-film coil 10 with a non-magnetic material by sputtering, it is made easy by using a non-magnetic material having fluidity like organic materials. Nevertheless, organic materials lack reliability in resistance to dry etching, resistance to corrosion, resistance to heat, rigidity and the like. In this embodiment, as described above, the first portion (the insulating layer 9B) is formed of a material that exhibits fluidity during its formation and is filled in between the windings of the thin-film coil 10. In addition, the second portion (the insulating layers 9A, 9C), which covers the thin-film coil 10 and the first portion, touches the first magnetic layer 8 and the second magnetic layer 14, and is exposed in the medium facing surface ABS, is formed of a material having a better resistance to corrosion, rigidity, and insulation property than those of the first portion. Accordingly, it is possible to completely fill the spaces between the windings of the thin-film coil 10 with the non-magnetic material and to thereby increase the reliability of the gap layer 9.

The thin-film magnetic head of this embodiment further comprises the MR element 5 serving as a read element. It is thereby possible to improve the read performance as compared with the case where reading is performed by using an induction-type electromagnetic transducer. Since the MR element 5 is shielded with the shield layers 3 and 6, the resolution of read operations is improved.

Reference is now made to FIG. 7 to FIG. 14 to describe a method of manufacturing the thin-film magnetic head of this embodiment.

In the manufacturing method, first, the insulating layer 2 is formed on the substrate 1. The bottom shield layer 3 is then formed on the insulating layer 2. Then, an insulating film to be a part of the insulating layer 4 is formed on the bottom shield layer 3. On this insulating film, formed are the MR element 5 and leads (not shown) to be connected to the MR element 5. Then, the MR element 5 and the leads are covered with another insulating film that makes the other part of the insulating layer 4, and the MR element 5 and the leads are embedded in the insulating layer 4.

Then, the top shield layer 6 is formed on the insulating layer 4, and the non-magnetic layer 7 is formed on the top shield layer 6. On the non-magnetic layer 7, the first magnetic layer 8 is formed to have a predetermined shape. Then, although not shown, the non-magnetic layer 7 and the first magnetic layer 8 are covered with a non-magnetic material such as alumina. The non-magnetic material is polished to expose the first magnetic layer 8, and the top surface of the first magnetic layer 8 is flattened. In FIG. 7 to FIG. 14, the substrate 1 to the non-magnetic layer 7 are not shown.

Figure 7:
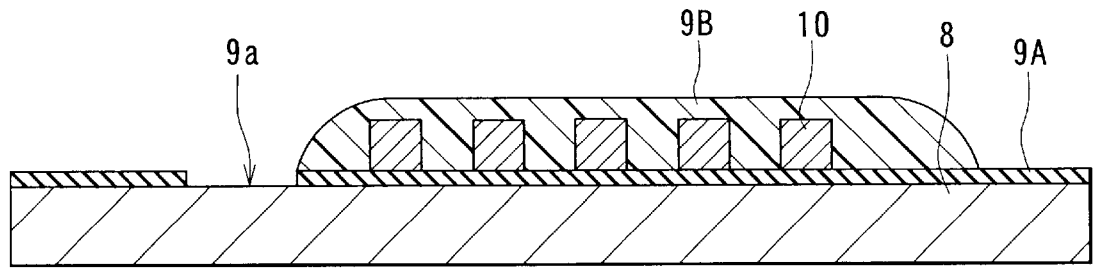
FIG. 7 is a cross-sectional view illustrating a step of a method of manufacturing the thin-film magnetic head according to the first embodiment of the invention.

Then, as shown in FIG. 7, a non-conductive and non-magnetic material such as alumina is sputtered onto the first magnetic layer 8 to form the insulating layer 9A. Subsequently, through the use of a known photolithography technique and dry etching, the contact hole 9a is formed in the insulating layer 9A where the coupling portion 14C is to be formed. The thin-film coil 10 is then formed on the insulating layer 9A with a known photolithography technique and a known deposition technique (e.g., electroplating). Then, the insulating layer 9B is formed with a known photolithography technique to fill at least spaces between the windings of the thin-film coil 10.

Figure 8:
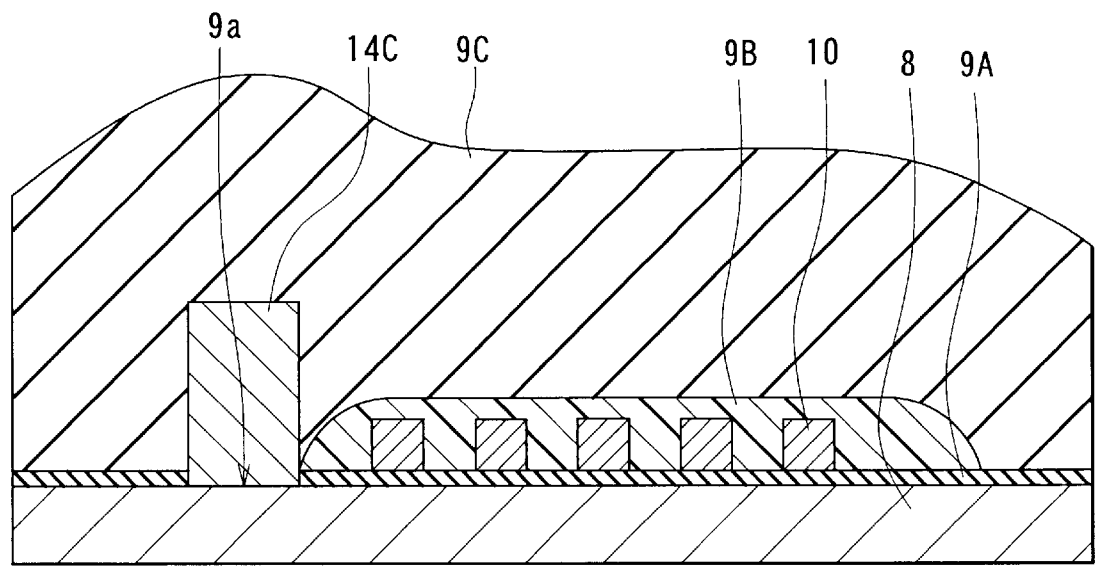
FIG. 8 is a cross-sectional view illustrating a step that follows FIG. 7.

Then, as shown in FIG. 8, with a known photolithography technique and a known deposition technique (e.g., electroplating), the coupling portion 14C is formed on a portion of the first magnetic layer 8 in which the contact hole 9a is formed. For example, the coupling portion 14C has a thickness of 1 to 6 $\mu$m. The insulating layer 9C is then formed by sputtering, so as to cover the thin-film coil 10, the insulating layer 9A, the insulating layer 9B and the coupling portion 14C. At this stage, the insulating layer 9C may have a thickness sufficiently enough to cover the coupling portion 14C, and the thickness may be 5 $\mu$m, for example.

Figure 9:
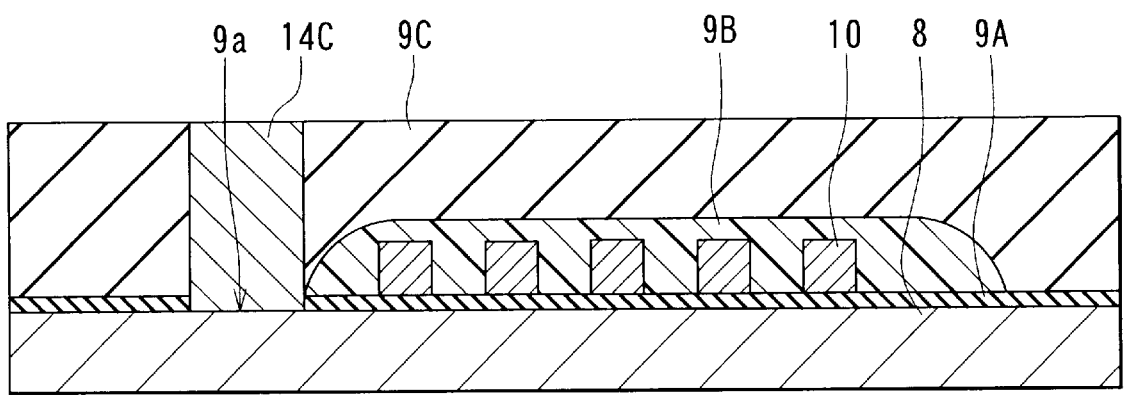
FIG. 9 is a cross-sectional view illustrating a step that follows FIG. 8.

Then, as shown in FIG. 9, the top surfaces of the insulating layer 9C and the coupling portion 14C are flattened through chemical mechanical polishing, for example. At this stage, the distance from the top surface of the first magnetic layer 8 to the top surfaces of the insulating layer 9C and the coupling portion 14C is 1 to 6 $\mu$m, for example. The coupling portion 14C is not necessarily required to be exposed at this stage, but may be exposed in a later step. The total thickness of the insulating layer 9A and the insulating layer 9C in the medium facing surface is a gap length of the write head (induction-type electromagnetic transducer).

Figure 10:
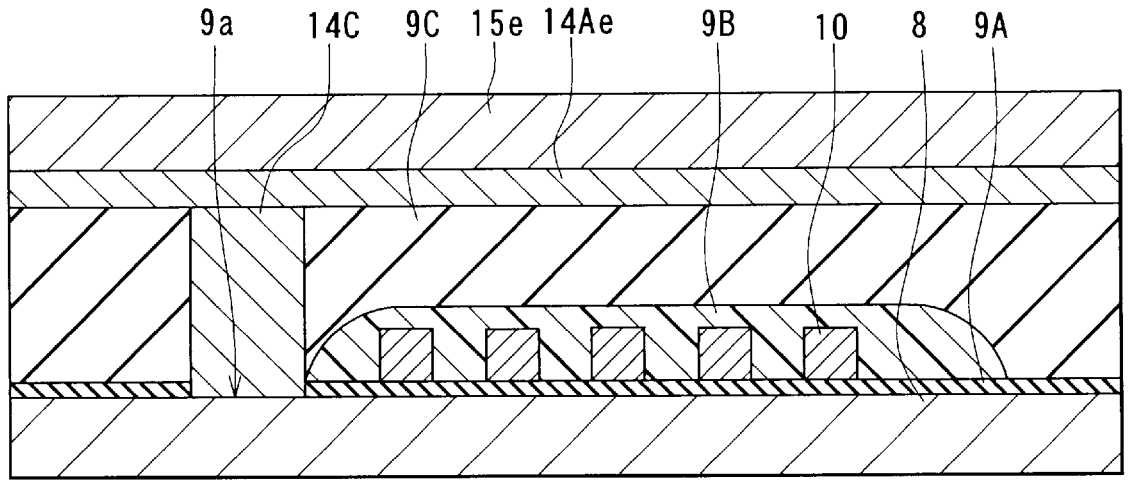
FIG. 10 is a cross-sectional view illustrating a step that follows FIG. 9.

Then, as shown in FIG. 10, a layer 14Ae to be etched is formed on the insulating layer 9C and the coupling portion 14C. The layer 14Ae is made of a material to make the pole portion layer 14A. The layer 14Ae preferably has a thickness of 0.1 to 0.8 $\mu$m, and more preferably a thickness of 0.3 to 0.8 $\mu$m. The layer 14Ae may be formed by electroplating or sputtering. If the layer 14Ae has a high surface roughness (e.g., its arithmetic mean roughness Ra is equal to or greater than 12 angstroms), it is preferable to polish the surface of the layer 14Ae through chemical mechanical polishing or the like, so as to flatten the surface.

Then, a non-magnetic layer 15e is formed on the layer 14Ae. The non-magnetic layer 15e preferably has a thickness of 0.5 $\mu$m or less.

Then, although not shown, an electrode layer for electroplating is formed by sputtering on the non-magnetic layer 15e. The electrode layer has a thickness of 0.1 $\mu$m or less, and is made of an iron-nickel alloy, for example.

Figure 11:
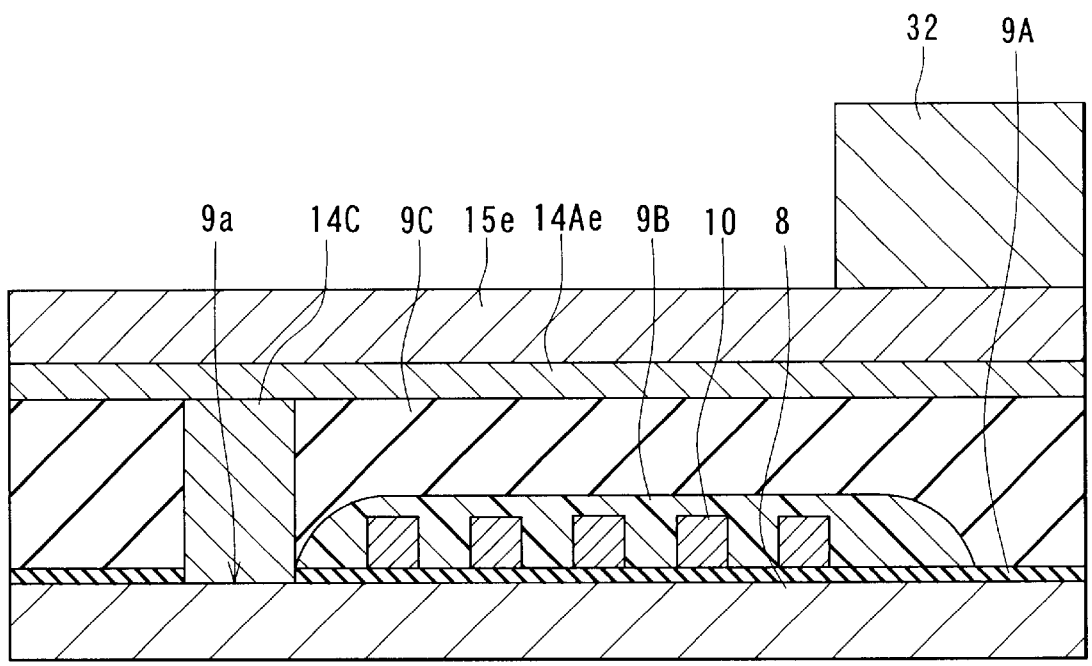
FIG. 11 is a cross-sectional view illustrating a step that follows FIG. 10.

Then, as shown in FIG. 11, a mask 32 for defining the shapes of the pole portion layer 14A and the non-magnetic layer 15 is formed on the aforementioned electrode layer.

The mask 32 is 1 to 4 $\mu$m in thickness and made of a material such as an iron-nickel alloy. The material of the mask 32 preferably has a good resistance to dry etching that will be carried out later. If an iron-nickel alloy is used as the material of the mask 32, frame plating, for example, is employed for forming the mask 32. Alternatively, a photoresist may be used to form the mask 32. In this case, photolithography is employed to form the mask 32.

Figure 12:
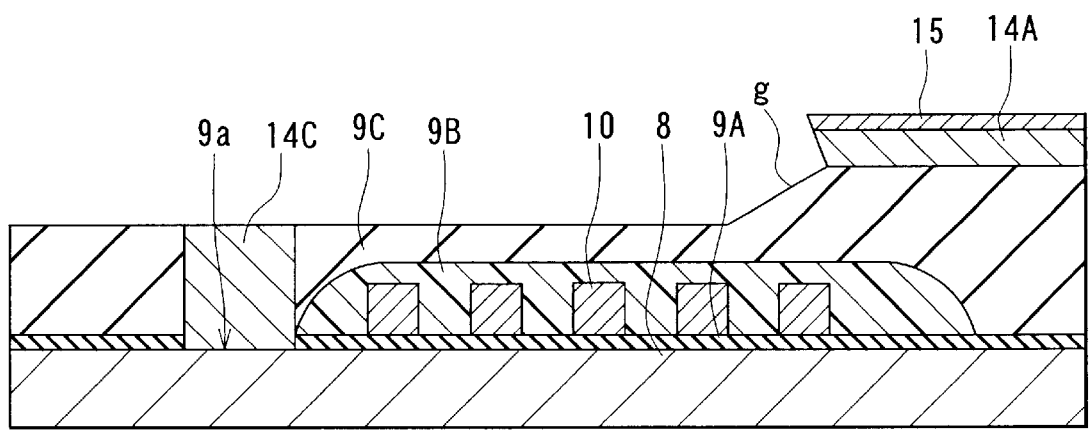
FIG. 12 is a cross-sectional view illustrating a step that follows FIG. 11.

Then, as shown in FIG. 12, the non-magnetic layer 15e and the layer 14Ae are etched by dry etching such as ion milling through the use of the mask 32, to thereby define the outer shapes of the non-magnetic layer 15 and the pole portion layer 14A. The width of the pole portion layer 14 in the medium facing surface may be defined to agree with the specification of the track width through the aforementioned etching.

In this embodiment, the aforementioned etching is carried out such that at least a part of the rear end surface of the pole portion layer 14A and the side surfaces of the pole portion layer 14A in the width direction is inclined. At this stage, the surface of the pole portion layer 14A exposed in the medium facing surface may be defined in shape. For example, if ion milling is employed for the etching, inclination of the aforementioned surfaces may be attained by projecting ions at an angle relative to the direction perpendicular to the surface of the substrate (or to the surfaces of the non-magnetic layer 15 and the pole portion layer 14A). It is preferable that the rear end surface and the side surfaces of the pole portion layer 14A, and the sides in the width direction of the surface of the pole portion layer 14A exposed in the medium facing surface, each form an angle of 92° to 110° with the surface of the pole portion layer 14A that faces the gap layer 9. In this case, by conducting the etching once, it is possible to define at the same time the shapes of the rear end surface and the side surfaces of the pole portion layer 14A, and the shape of the surface of the pole portion layer 14A exposed in the medium facing surface.

The etching may be stopped when the upper end of an inclined surface g of the insulating layer 9C shown in FIG. 12 comes to the intersection of the rear end surface of the pole portion layer 14A and the surface of the pole portion layer 14A that faces the gap layer 9. At this stage, the mask 32 may be allowed to remain if it is non-magnetic and sufficiently reliable in terms of resistance to corrosion, or may be removed if no longer necessary.

Through the aforementioned etching, the outer shapes of the non-magnetic layer 15 and the pole portion layer 14A are defined and the coupling portion 14C is exposed. In order for the coupling portion 14C to be exposed at this stage, the coupling portion 14C should previously have a greater thickness than desired.

Then, although not shown, an electrode layer for electroplating is formed by sputtering on the non-magnetic layer 15, the insulating layer 9C and the coupling portion 14C. The electrode layer may have a thickness of 0.1 µm or less, and may be formed of an iron-nickel alloy, with Ti (titanium) deposited to underlie the electrode layer. At this time, the pole portion layer 14A may be covered with a resist so as to prevent the electrode layer from adhering to the portion of the pole portion layer 14A exposed in the medium facing surface.

Figure 13:
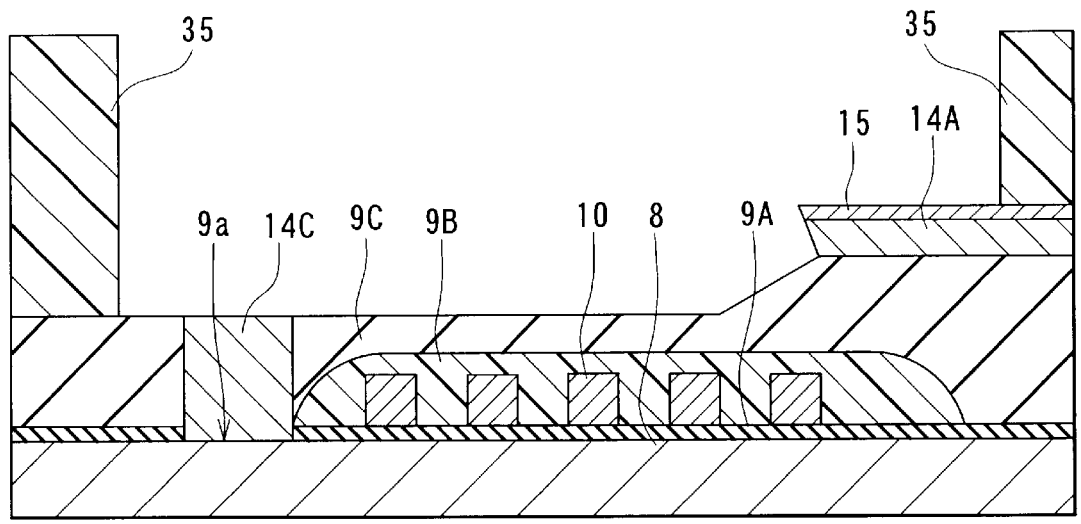
FIG. 13 is a cross-sectional view illustrating a step that follows FIG. 12.

Then, as shown in FIG. 13, a resist frame 35 having a gap portion corresponding to the shape of the yoke portion layer 14B is formed of a photoresist on the aforementioned electrode layer.

Figure 14:
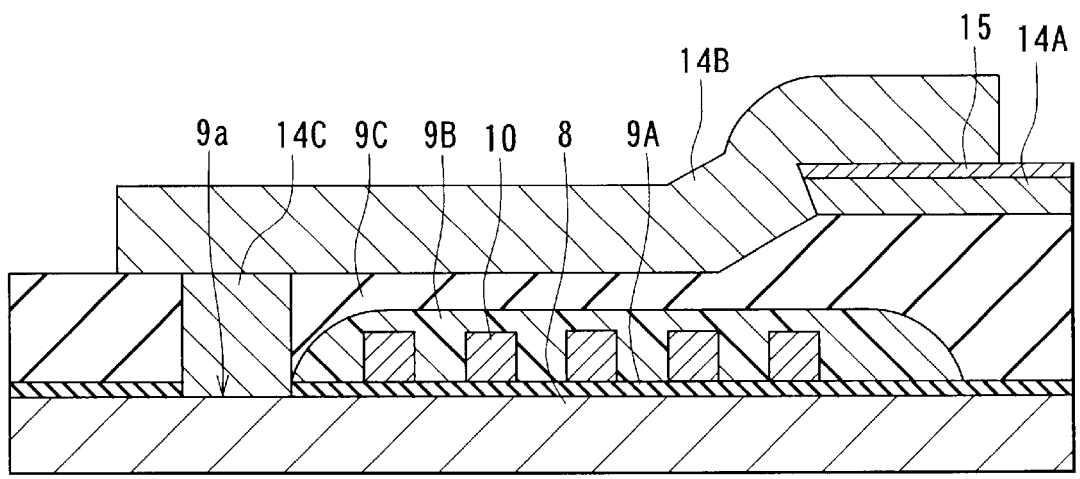
FIG. 14 is a cross-sectional view illustrating a step that follows FIG. 13.

Then, as shown in FIG. 14, the yoke portion layer 14B is formed on the electrode layer by electroplating (frame plating) through the use of the resist frame 35. The resist frame 35 is then removed. A lift-off procedure is also employable to form the yoke portion layer 14B. However, when the pole portion layer 14A has inclined side surfaces as in the thin-film magnetic head of this embodiment (see FIG. 13), electroplating is preferably used so as to allow the shape of the yoke portion layer 14B to follow the shape of the base thereof.

Then, although not shown, the electrode layer, except for the portion underlying the yoke portion layer 14B, is removed by dry etching.

Then, as shown in FIG. 1, the protective layer 17 is formed to cover the second magnetic layer 14. Then, through the steps of forming leads, terminals and the like on the protective layer 17, cutting the substrate for each slider, polishing the medium facing surface ABS, preparing rails for flying and so on, the thin-film magnetic head is completed.

The method of manufacturing the thin-film magnetic head of this embodiment can provide the following functions and effects in addition to those provided by the thin-film magnetic head of this embodiment.

In this embodiment, the step of forming the pole portion layer 14A includes the steps of: forming the layer 14Ae to be etched, made of a material to make the pole portion layer 14A, on the gap layer 9 and the coupling portion 14C; and defining the outer shape of the pole portion layer 14A and exposing the coupling portion 14C through selectively etching the layer 14Ae by dry etching. In this embodiment, through etching the layer 14Ae by dry etching, the shape of the base of the yoke portion layer 14B is defined such that the base has a gentle slope extending from the rear end surface of the pole portion layer 14A to the upper end of the coupling portion 14C. Accordingly, by forming the yoke portion layer 14B on this base, it is possible to form the magnetic path that connects the coupling portion 14C and the pole portion layer 14A in the shortest distance.

In this embodiment, if the top surface of the layer 14Ae is flattened by polishing after the step of forming the layer 14Ae, the end of the pole portion layer 14A farther from the gap layer 9 can be completely made flat in the medium facing surface ABS. The magnetic field produced from the pole portion layer 14A in the medium facing surface ABS is thereby allowed to be uniform in the direction intersecting the track. Consequently, it is possible to prevent the bit pattern of the recording medium from being distorted, and to thereby improve the linear recording density.

In this embodiment, the top surfaces of the insulating layer 9C to be a base of the layer 14Ae and the coupling portion 14C are flattened by polishing before the step of forming the layer 14Ae. This allows the gap-layer-9-side end of the pole portion layer 14A to be flat in the medium facing surface ABS. If the layer 14Ae is formed by sputtering, a good uniformity in thickness of the layer 14Ae as deposited is attained, so that the end of the pole portion layer 14A farther from the gap layer 9 is also allowed to be flat in the medium facing surface ABS. As a result, the magnetic field produced from the pole portion layer 14A in the medium facing surface ABS is made uniform in the direction intersecting the track. Consequently, it is possible to prevent the bit pattern of the recording medium from being distorted, and to thereby improve the linear recording density.

In this embodiment, the step of forming the pole portion layer 14A includes: forming the layer 14Ae to be etched; forming the non-magnetic layer 15e on the layer 14Ae; forming the mask 32 corresponding to the shape of the pole portion layer 14A on the non-magnetic layer 15e; and etching the non-magnetic layer 15e and the layer 14Ae using the mask 32, thereby defining the outer shape of the pole portion layer 14A. Thus, according to the embodiment, it is possible to define the outer shape of the pole portion layer 14A with the top surface of the layer 14Ae protected by the non-magnetic layer 15e. It is therefore possible to protect the edges at which the rear end surface of the pole portion layer 14A and the side surfaces of the pole portion layer 14A in the width direction intersect the surface of the pole portion layer 14A that faces the non-magnetic layer 15, and to maintain the flatness of the end of the pole portion layer 14A farther from the gap layer 9 in the medium facing surface.

In this embodiment, if the mask 32 is formed to have a good resistance to dry etching, it is possible to define the outer shape of the pole portion layer 14A by dry etching through the use of the mask 32, even when the pole portion layer 14A is made of a material having a good resistance to dry etching.

In this embodiment, electroplating may be employed to form the yoke portion layer 14B in the step of forming the yoke portion layer 14B. This facilitates the formation of the yoke portion layer 14B and makes it possible to form the yoke portion layer into a shape that well follows the shape of the base thereof.

SECOND EMBODIMENT

Figure 15:
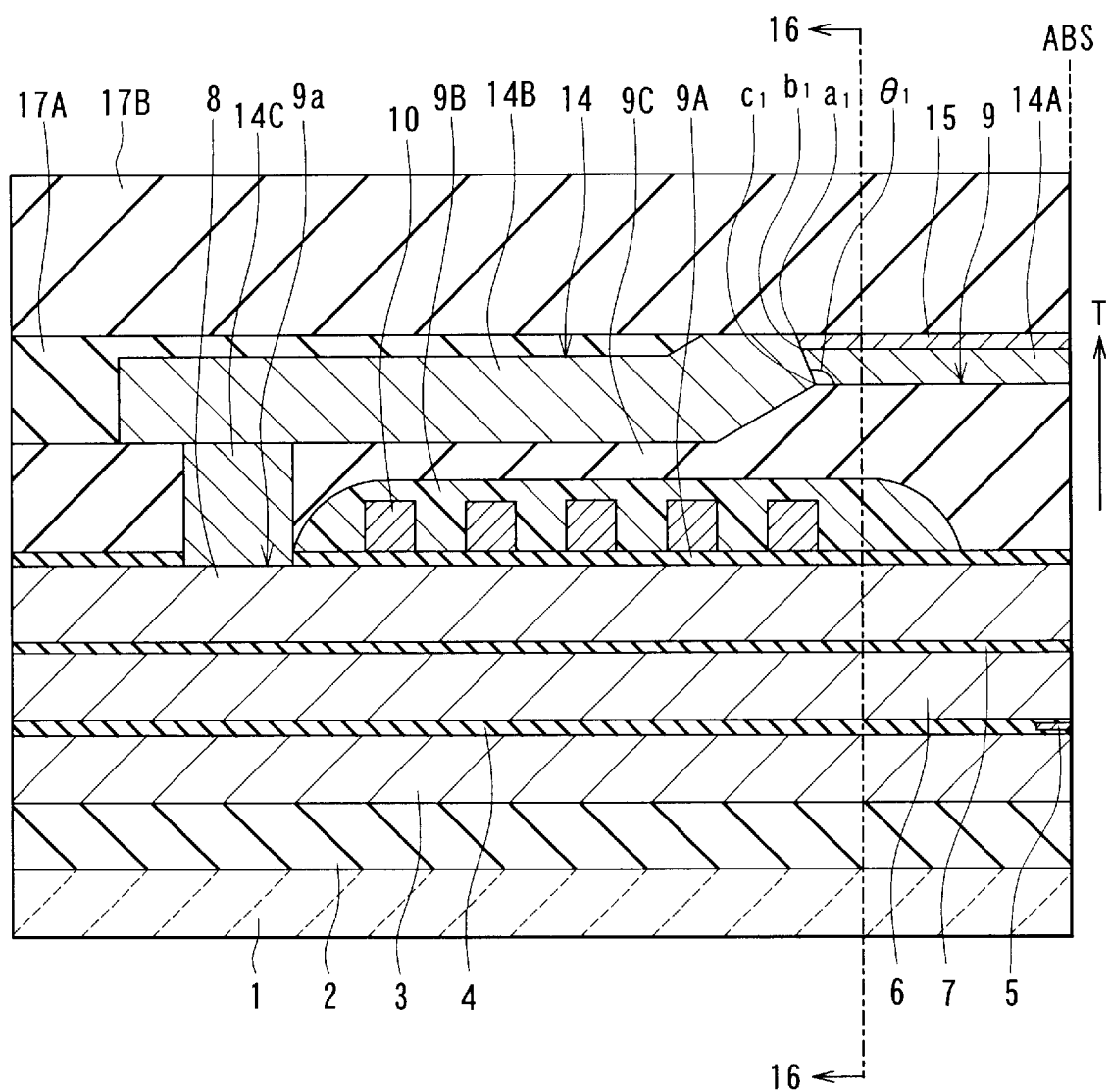
FIG. 15 is a cross-sectional view illustrating a structure of a thin-film magnetic head according to a second embodiment of the invention.
Figure 16:
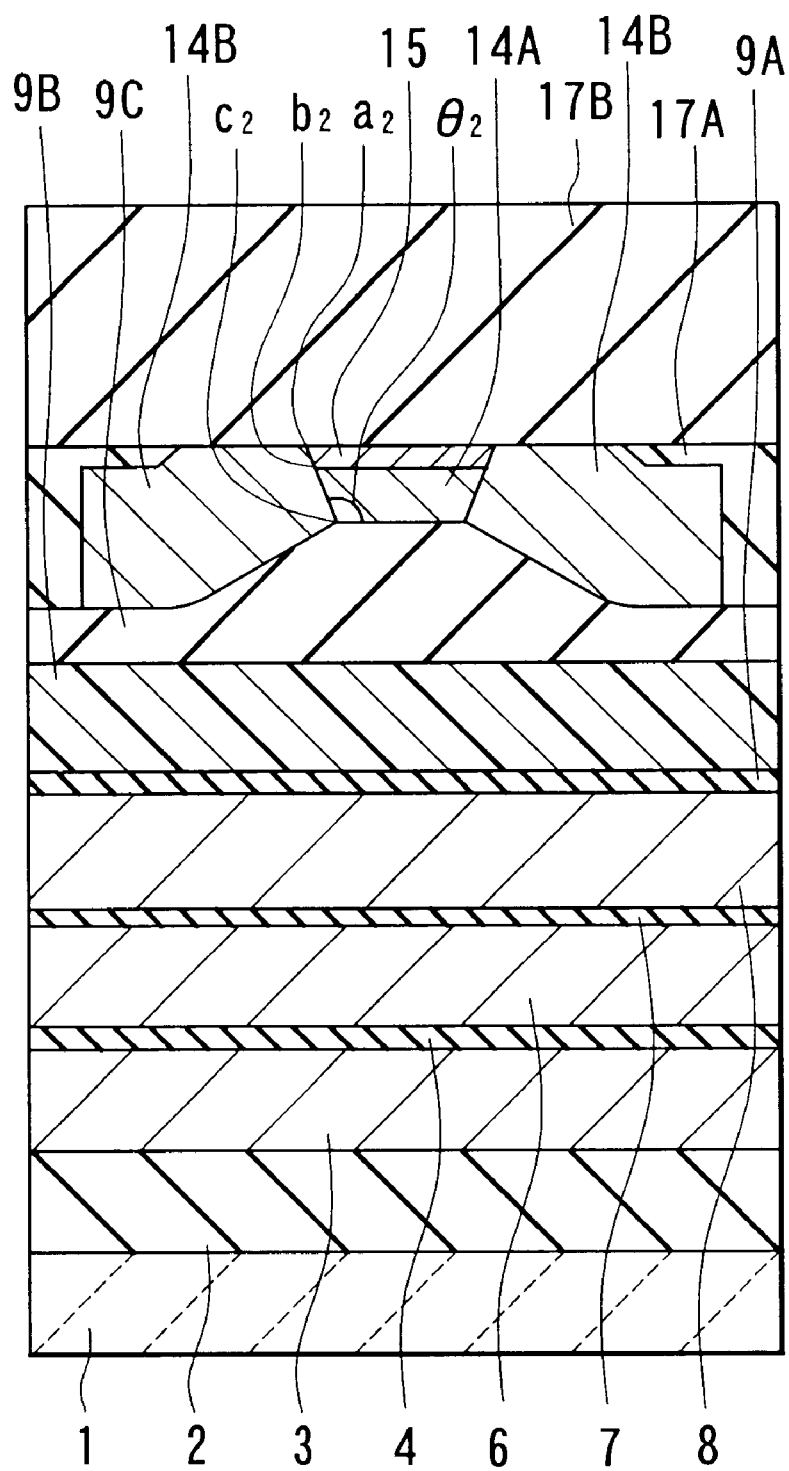
FIG. 16 is a cross-sectional view taken along line 16—16 of FIG. 15.
Figure 17:
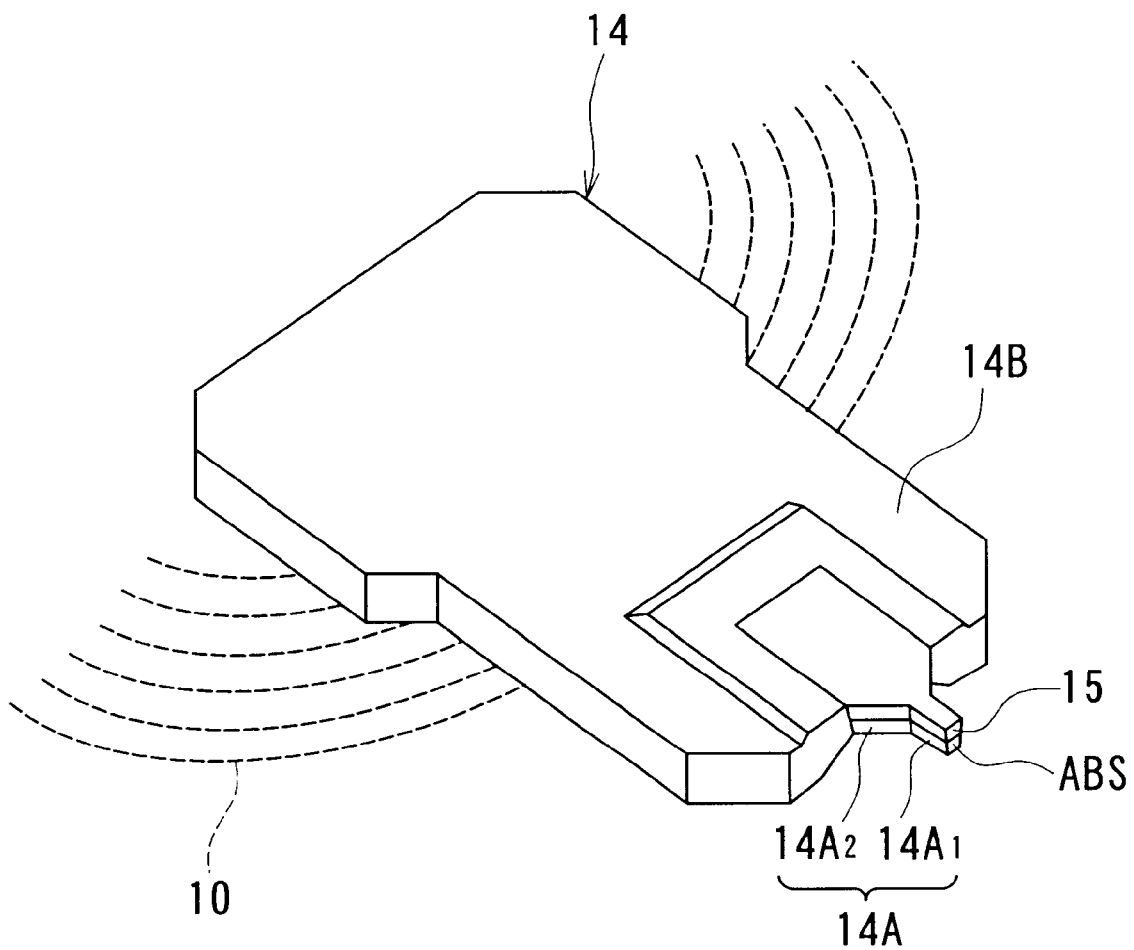
FIG. 17 is a perspective view illustrating the main part of the thin-film magnetic head shown in FIG. 15.

Now, a thin-film magnetic head of a second embodiment of the invention and a method of manufacturing the same will be described. Reference is now made to FIG. 15 to FIG. 17 to describe the structure of the thin-film magnetic head of this embodiment. FIG. 15 is a cross-sectional view illustrating the structure of the thin-film magnetic head of this embodiment. FIG. 15 shows a cross section orthogonal to the medium facing surface and the surface of the substrate. The arrow indicated by symbol T in FIG. 15 shows the traveling direction of a recording medium. FIG. 16 is a cross-sectional view taken along line 16—16 of FIG. 15. FIG. 17 is a perspective view illustrating the main part of the thin-film magnetic head shown in FIG. 15.

The thin-film magnetic head of this embodiment has a structure in which a portion of the yoke portion layer 14B of the first embodiment, the portion being adjacent to the top surface of the pole portion layer 14A via the non-magnetic layer 15, is eliminated. In this embodiment, a protective layer 17A made of a non-conductive and non-magnetic material such as alumina is provided around the yoke portion layer 14B. The vicinity of a part of the surface of the yoke portion layer 14B farther from the gap layer 9, the part being magnetically connected to the pole portion layer 14A at the rear end surface of the pole portion layer 14A and the side surfaces of the pole portion layer 14A in the width direction, is flattened together with the surface of the non-magnetic layer 15 farther from the gap layer 9, and with the top surface of the protective layer 17A. On these flattened surfaces, provided is a protective layer 17B that is equivalent to the protective layer 17 of the first embodiment. The structure of the thin-film magnetic head of this embodiment is otherwise the same as that of the first embodiment.

Figure 18:
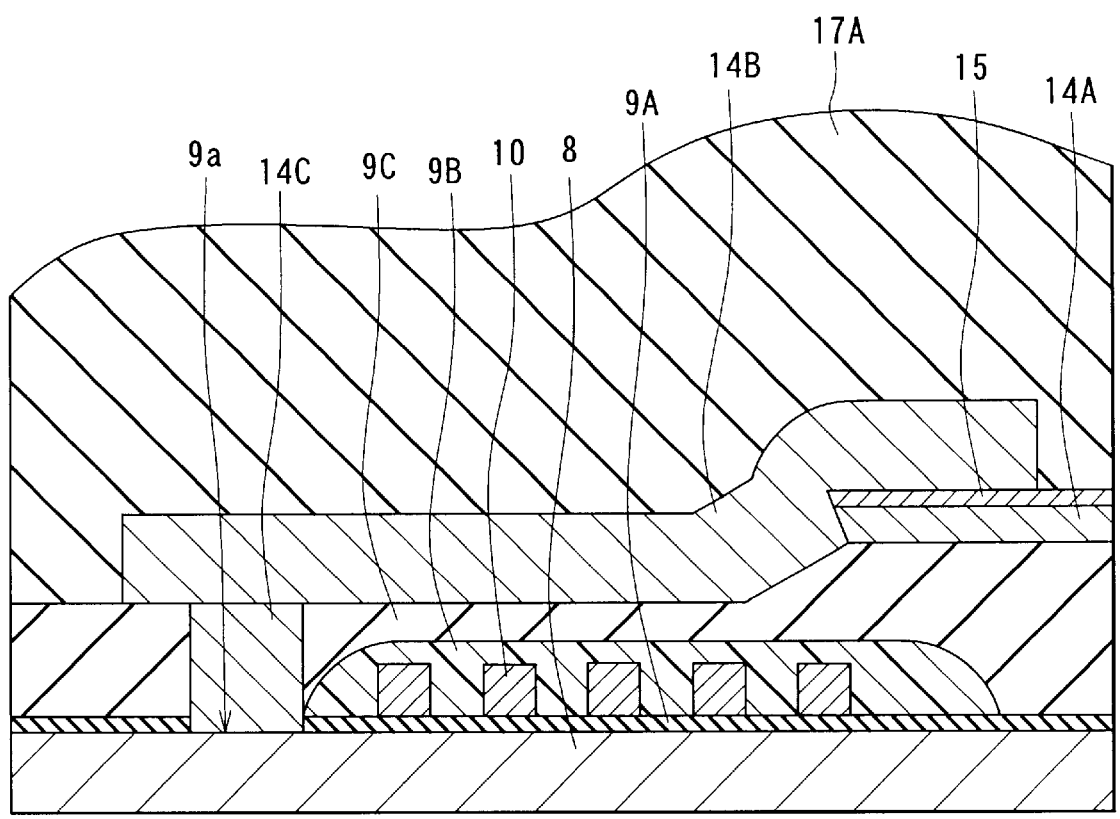
FIG. 18 is a cross-sectional view illustrating a step of a method of manufacturing the thin-film magnetic head according to the second embodiment of the invention.
Figure 19:
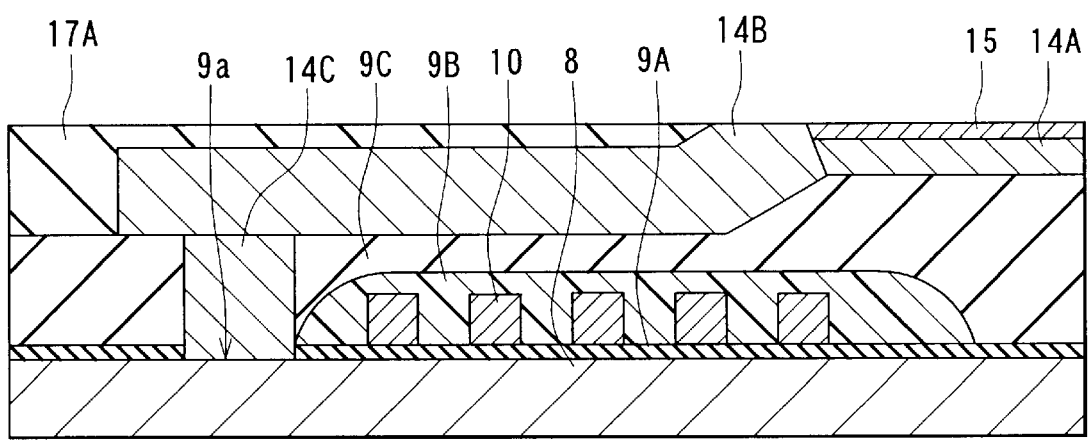
FIG. 19 is a cross-sectional view illustrating a step that follows FIG. 18.

Reference is now made to FIG. 18 and FIG. 19 to describe the method of manufacturing the thin-film magnetic head of this embodiment. In FIG. 18 and FIG. 19, the substrate 1 to the non-magnetic layer 7 are not shown. The method of manufacturing the thin-film magnetic head of this embodiment employs the same steps as those of the first embodiment up to the step of forming the yoke portion layer 14B as shown in FIG. 14.

Then, as shown in FIG. 18, the protective layer 17A is formed to cover the non-magnetic layer 15 and the yoke portion layer 14B.

Then, as shown in FIG. 19, the protective layer 17A is polished through chemical mechanical polishing, for example, to expose the non-magnetic layer 15, and, the vicinity of part of the surface of the yoke portion layer 14B farther from the gap layer 9, the part being magnetically connected to the pole portion layer 14A at least in part of the rear end surface of the pole portion layer 14A and the side surfaces of the pole portion layer 14A in the width direction, is flattened together with the surface of the non-magnetic layer 15 farther from the gap layer 9, and with the top surface of the protective layer 17A. In FIG. 19, the surface of the yoke portion layer 14B farther from the gap layer 9 is partially exposed from the protective layer 17A. However, this surface of the yoke portion layer 14B may be entirely exposed from the protective layer 17A.

Then, as shown in FIG. 15, the protective layer 17B is formed over the entire surface. Then, through the steps of forming leads, terminals and the like on the protective layer 17B, cutting the substrate for each slider, polishing the medium facing surface ABS, preparing rails for flying and so on, the thin-film magnetic head is completed.

In this embodiment, the vicinity of part of the surface of the yoke portion layer 14B farther from the gap layer 9, the part being magnetically connected to the pole portion layer 14A at the rear end surface of the pole portion layer 14A and the side surfaces of the pole portion layer 14A in the width direction, is flattened together with the surface of the non-magnetic layer 15 farther from the gap layer 9. Accordingly, it is possible to increase the percentage of the component of the magnetic field in the direction perpendicular to the surface of the recording medium, generated from the magnetic pole portion.

The other functions and effects of the head of this embodiment are the same as those of the head of the first embodiment except for the differences resulting from the following structural difference: in the first embodiment the yoke portion layer 14B is magnetically connected to the top surface of the pole portion layer 14A via the non-magnetic layer 15, but not in this embodiment.

In this embodiment, the surface of the pole portion layer 14A farther from the gap layer 9 may be flattened together with the top surface of the protective layer 17A, without providing the non-magnetic layer 15. In this case, it is possible to maintain the flatness of the end of the pole portion layer 14A farther from the gap layer 9 in the medium facing surface, without providing the non-magnetic layer 15.

THIRD EMBODIMENT

Figure 20:
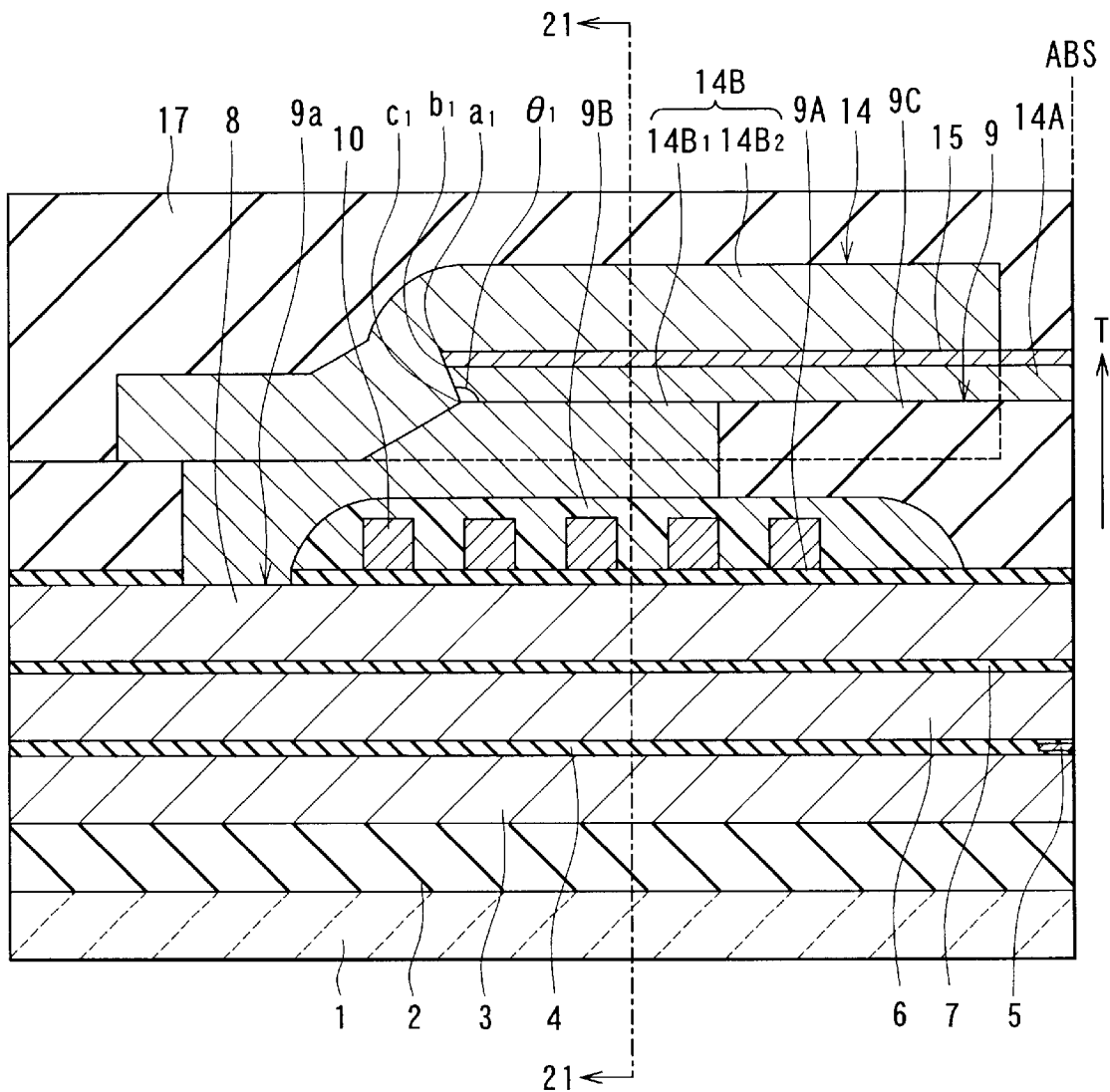
FIG. 20 is a cross-sectional view illustrating a structure of a thin-film magnetic head according to a third embodiment of the invention.
Figure 21:
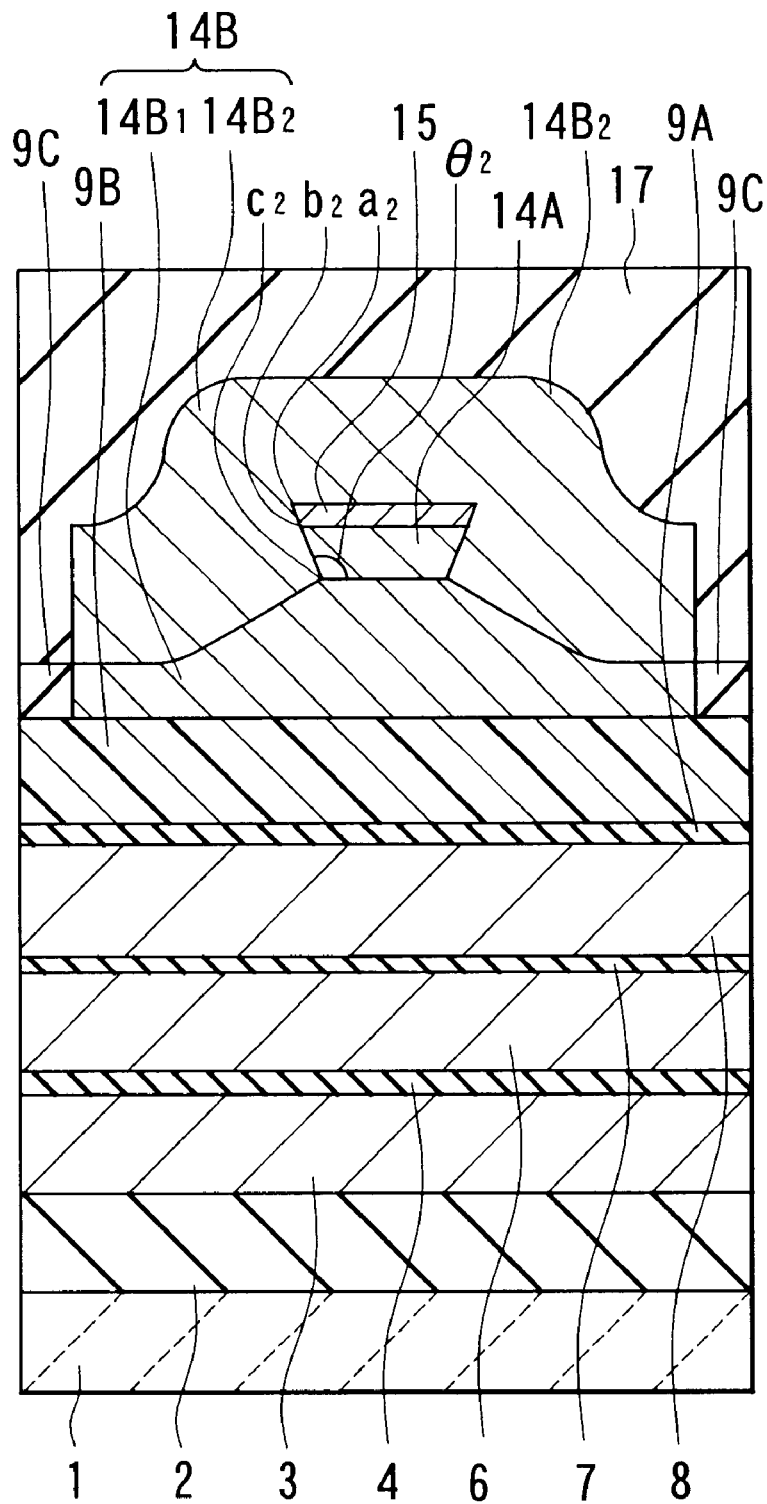
FIG. 21 is a cross-sectional view taken along line 21—21 of FIG. 20.

Now, a thin-film magnetic head of a third embodiment of the invention and a method of manufacturing the same will be described. Reference is now made to FIG. 20 and FIG. 21 to describe the structure of the thin-film magnetic head of this embodiment. FIG. 20 is a cross-sectional view illustrating the structure of the thin-film magnetic head of this embodiment. FIG. 20 shows a cross section orthogonal to the medium facing surface and the surface of the substrate. The arrow indicated by symbol T in FIG. 20 shows the traveling direction of a recording medium. FIG. 21 is a cross-sectional view taken along line 21—21 of FIG. 20.

In the thin-film magnetic head of this embodiment, the yoke portion layer 14B has: a first layer 14B1 that is in contact with and magnetically connected to the first magnetic layer 8 and the surface of the pole portion layer 14A that faces the gap layer 9; and a second layer 14B$_2$ that is in contact with and magnetically connected to the first layer 14B$_1$, the rear end surface of the pole portion layer 14A, and the side surfaces of the pole portion layer 14A in the width direction.

The first layer 14B$_1$ of the yoke portion layer 14B is formed on the first magnetic layer 8 and the insulating layer 9B to extend from where the contact hole 9a is formed toward the medium facing surface ABS, to the end surface of the insulating layer 9C farther from the medium facing surface ABS. The thickness of the first layer 14B$_1$ measured at the position of the contact hole 9a is greater than the total thickness of the insulating layers 9A and 9B, and is equal to or greater than 3 μm, for example. For example, the end of the first layer 14B$_1$ closer to the medium facing surface ABS is located at a distance of 1.5 μm or more from the medium facing surface ABS, and located closer to the medium facing surface ABS than the rear end surface of the pole portion layer 14A. The first layer 14B$_1$ may be made of an iron-nickel-based alloy or Permalloy, or of a high saturated magnetic flux density material.

The top surface of part of the first layer 14B$_1$ near the medium facing surface ABS and the top surface of the insulating layer 9C are flattened. The pole portion layer 14A is formed on the flattened top surfaces of the first layer 14B$_1$ and the insulating layer 9C. Accordingly, the first layer 14B$_1$ of the yoke portion layer 14B is in contact with and magnetically connected to part of the surface of the pole portion layer 14A that faces the gap layer 9.

The second layer 14B$_2$ of the yoke portion layer 14B is disposed on the first layer 14B$_1$ and the non-magnetic layer 15. The second layer 14B$_2$ is in contact with and magnetically connected to the first layer 14B$_1$, the rear end surface of the pole portion layer 14A and the side surfaces of the pole portion layer 14A in the width direction. Part of the second layer 14B$_2$ near the medium facing surface ABS is adjacent to the top surface of the pole portion layer 14A via the non-magnetic layer 15, and is magnetically connected to the pole portion layer 14A via the non-magnetic layer 15. The second layer 14B$_2$ of the yoke portion layer 14B has a thickness of 0.5 to 2 μm, for example. The second layer 14B$_2$ may be made of an iron-nickel-based alloy or Permalloy, or of a high saturated magnetic flux density material, for example.

The structure of the thin-film magnetic head of this embodiment is otherwise the same as that of the first embodiment.

Reference is now made to FIG. 22 to FIG. 29 to describe the method of manufacturing the thin-film magnetic head of this embodiment. In FIG. 22 to FIG. 29, the substrate 1 to the non-magnetic layer 7 are not shown. The method of manufacturing the thin-film magnetic head of this embodiment employs the same steps as those of the first embodiment up to the step of forming the insulating layer 9B as shown in FIG. 7.

Figure 22:
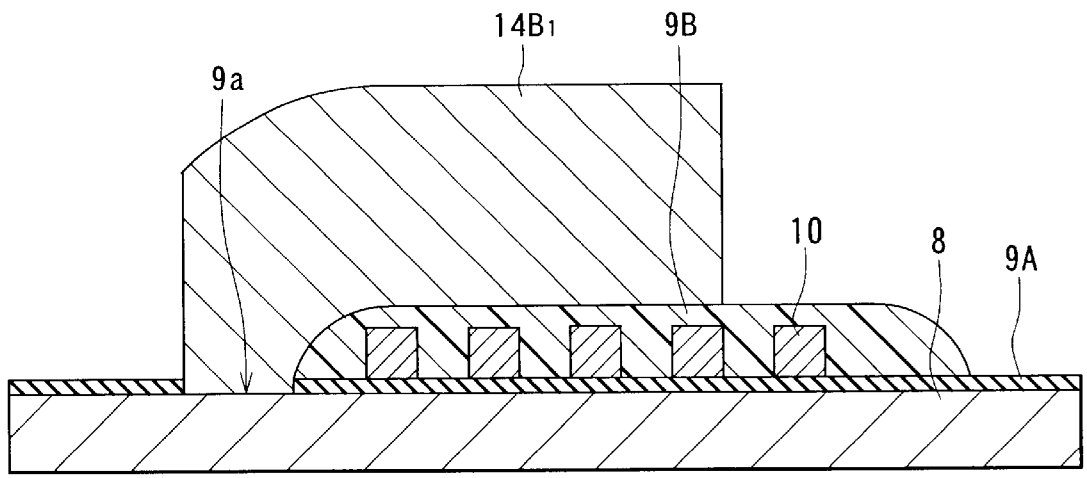
FIG. 22 is a cross-sectional view illustrating a step of a method of manufacturing the thin-film magnetic head according to the third embodiment of the invention.

Then, as shown in FIG. 22, with a known photolithography technique and a known deposition technique (e.g., electroplating), the first layer 14B$_1$ of the yoke portion layer 14B is formed on the first magnetic layer 8 and the insulating layer 9B to extend from where the contact hole 9a is formed to a predetermined position towards the medium facing surface ABS. At this stage, for example, the first layer 14B$_1$ has a thickness of 3 μm or more, a depth (or a length perpendicular to the medium facing surface ABS) of 2 to 10 μm, and a width of 5 to 20 μm.

Figure 23:
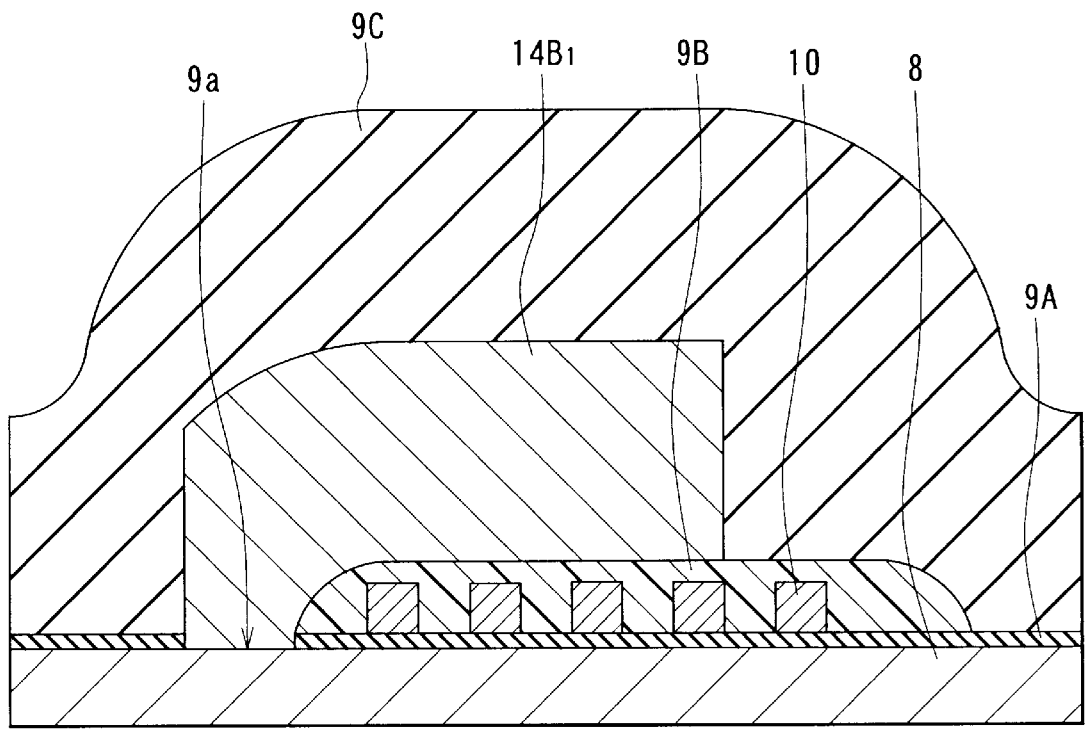
FIG. 23 is a cross-sectional view illustrating a step that follows FIG. 22.

Then, as shown in FIG. 23, the insulating layer 9C is formed by sputtering, so as to cover the insulating layer 9A, the insulating layer 9B, and the first layer 14B$_1$ of the yoke portion layer 14B. At this stage, the insulating layer 9C has a thickness equal to or greater than that of the first layer 14B$_1$.

Figure 24:
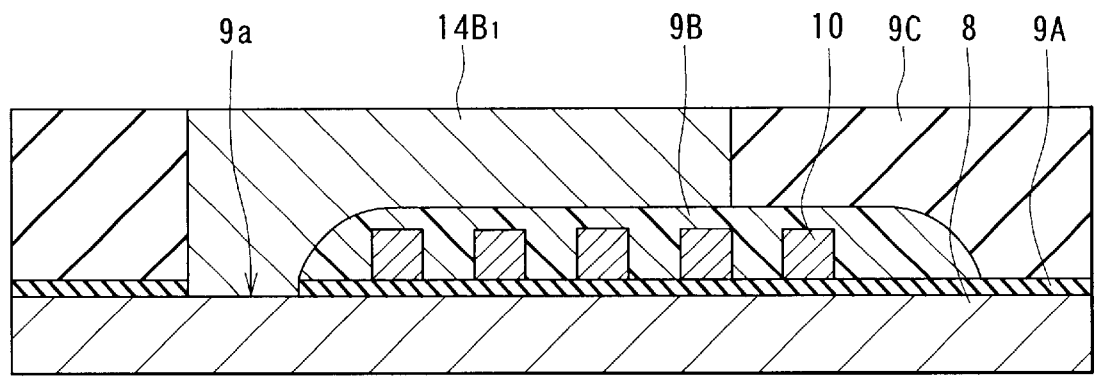
FIG. 24 is a cross-sectional view illustrating a step that follows FIG. 23.

Then, as shown in FIG. 24, the surface of the insulating layer 9C is polished by chemical mechanical polishing, for example, so that the first layer 14B$_1$ of the yoke portion layer 14B is exposed, and the top surfaces of the insulating layer 9C and the first layer 14B$_1$ are flattened. At this stage, the distance from the top surface of the first magnetic layer 8 to the top surface of the insulating layer 9C is 3 to 6 μm, for example.

Figure 25:
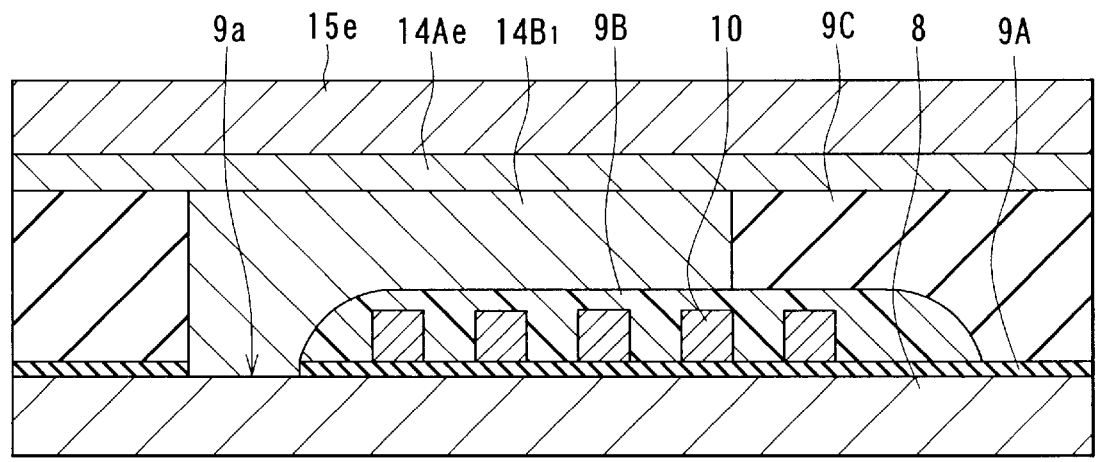
FIG. 25 is a cross-sectional view illustrating a step that follows FIG. 24.

Then, as shown in FIG. 25, the layer 14Ae to be etched and the non-magnetic layer 15e are formed on the insulating layer 9C and the first layer 14B$_1$ in the same manner as in the first embodiment.

Although not shown, an electrode layer for electroplating is then formed by sputtering on the non-magnetic layer 15e. The electrode layer has a thickness of 0.1 μm or less, and is made of an iron-nickel alloy, for example.

Figure 26:
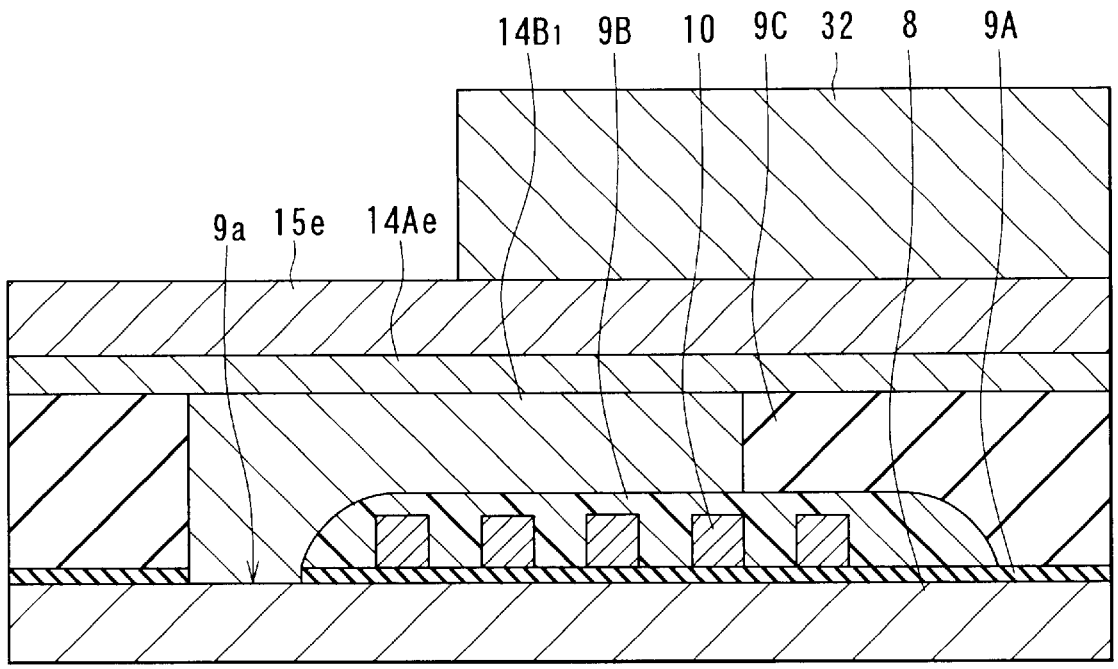
FIG. 26 is a cross-sectional view illustrating a step that follows FIG. 25.

Then, as shown in FIG. 26, the mask 32 for defining the shapes of the pole portion layer 14A and the non-magnetic layer 15 is formed on the aforementioned electrode layer, as in the first embodiment.

Figure 27:
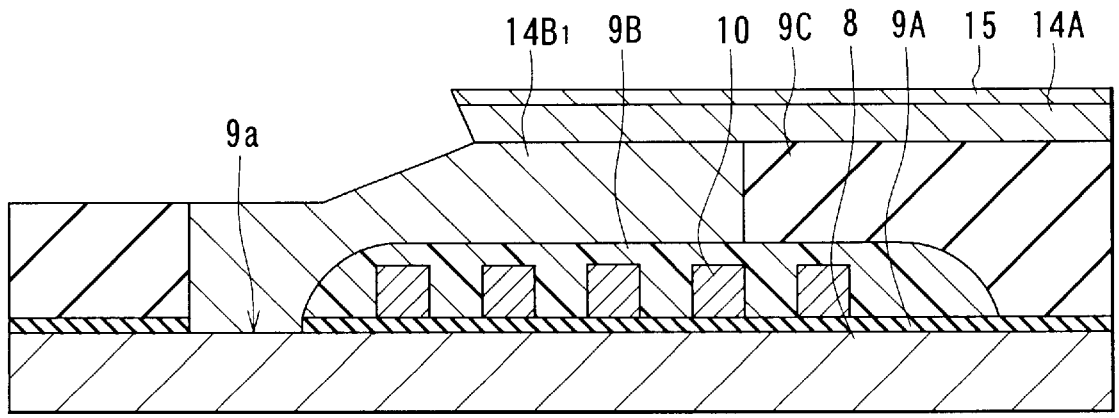
FIG. 27 is a cross-sectional view illustrating a step that follows FIG. 26.

Then, as shown in FIG. 27, the non-magnetic layer 15e and the layer 14Ae are etched by dry etching such as ion milling through the use of the mask 32, so that the outer shapes of the non-magnetic layer 15 and the pole portion layer 14A are defined. As in the first embodiment, the etching is carried out so that at least part of the rear end surface of the pole portion layer 14A and the side surfaces of the pole portion layer 14A in the width direction is inclined. At this stage, the surface of the pole portion layer 14A exposed in the medium facing surface is also defined in shape. The mask 32 may be allowed to remain if it is non-magnetic and sufficiently reliable in terms of resistance to corrosion, or may be removed if no longer necessary.

Then, although not shown, an electrode layer for electroplating is formed by sputtering on the non-magnetic layer 15, the insulating layer 9C and the first layer 14B$_1$ of the yoke portion layer 14B. The electrode layer may have a thickness of 0.1 μm or less, and may be formed of an iron-nickel alloy, for example, with Ti (titanium) deposited to underlie the electrode layer.

Figure 28:
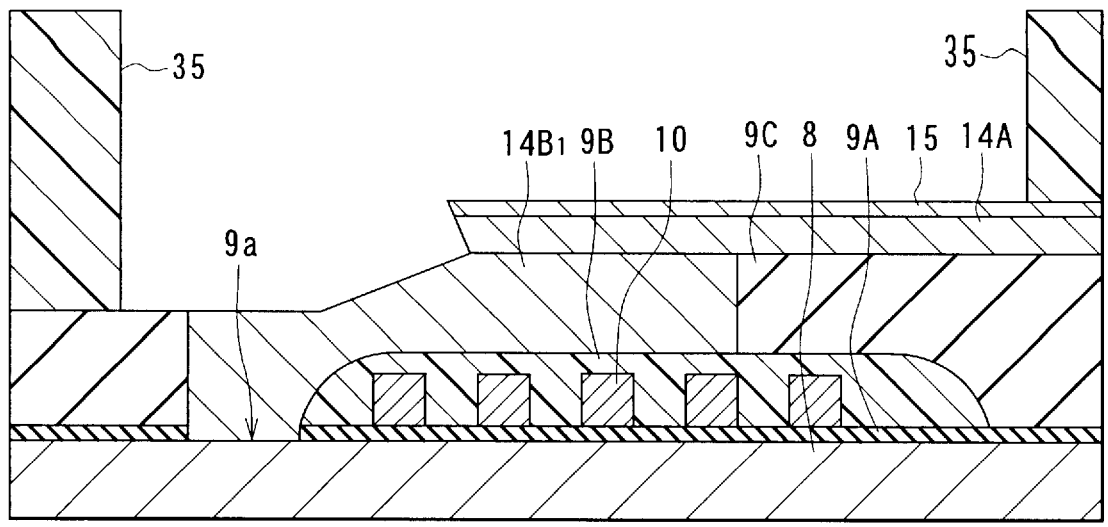
FIG. 28 is a cross-sectional view illustrating a step that follows FIG. 27.

Then, as shown in FIG. 28, the resist frame 35 having a gap portion corresponding to the shape of the second layer 14B$_2$ of the yoke portion layer 14B is formed of a photoresist on the aforementioned electrode layer. At this stage, the portion of the pole portion layer 14A exposed in the medium facing surface may be covered with a resist to prevent the electrode layer from adhering to this portion.

Figure 29:
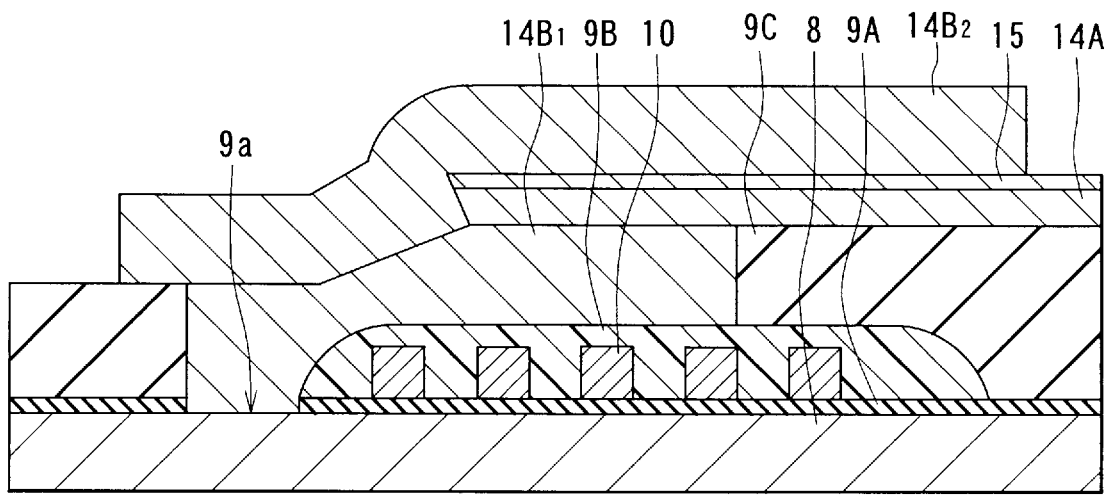
FIG. 29 is a cross-sectional view illustrating a step that follows FIG. 28.

Then, as shown in FIG. 29, the second layer 14B$_2$ of the yoke portion layer 14B is formed on the electrode layer by electroplating (frame plating) through the use of the resist frame 35. The resist frame 35 is then removed.

Although not shown, the electrode layer, except for the portion underlying the second layer 14B$_2$ of the yoke portion layer 14B, is then removed by dry etching.

As shown in FIG. 20, the protective layer 17 is then formed to cover the second magnetic layer 14. Then, through the steps of forming leads, terminals and the like on the protective layer 17, cutting the substrate for each slider, polishing the medium facing surface ABS, preparing rails for flying and so on, the thin-film magnetic head is completed.

In this embodiment, the yoke portion layer 14B is magnetically connected to the pole portion layer 14A at the surface of the pole portion layer 14A that faces the gap layer 9, too. Accordingly, a greater area is achieved for the portion at which the pole portion layer 14A and the yoke portion layer 14B are magnetically connected to each other. As a result, it is possible to efficiently introduce the magnetic flux from the yoke portion layer 14B into the pole portion layer 14A.

The remainder of the structure, functions and effects of this embodiment are similar to those of the first embodiment.

FOURTH EMBODIMENT

Figure 30:
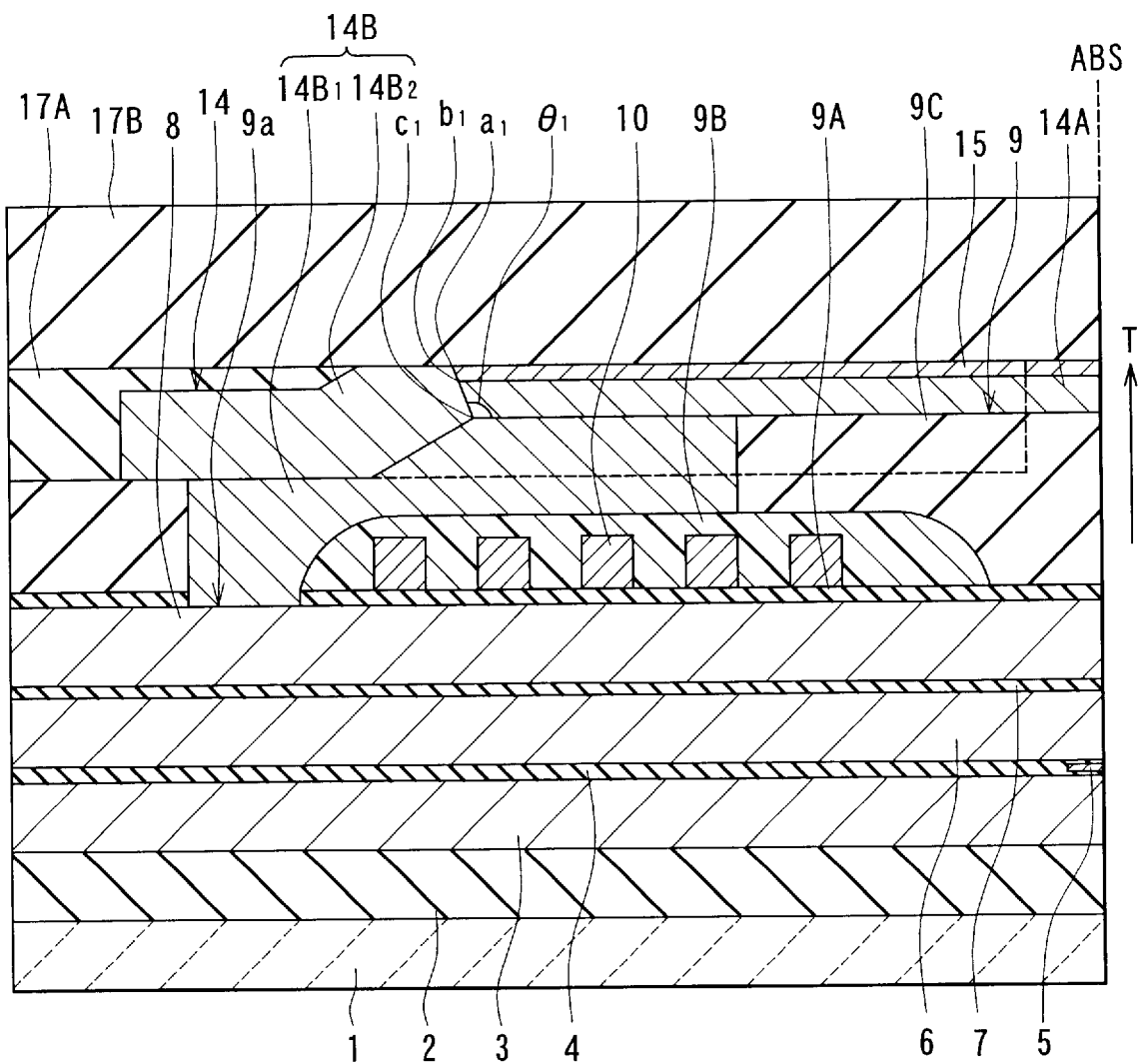
FIG. 30 is a cross-sectional view illustrating a structure of a thin-film magnetic head according to a fourth embodiment of the invention.

Now, a thin-film magnetic head of a fourth embodiment of the invention and a method of manufacturing the same will be described. Reference is now made to FIG. 30 to describe the structure of the thin-film magnetic head of this embodiment. FIG. 30 is a cross-sectional view illustrating the structure of the thin-film magnetic head of this embodiment. FIG. 30 shows a cross section orthogonal to the medium facing surface and the surface of the substrate. The arrow indicated by symbol T in FIG. 30 shows the traveling direction of a recording medium.

The thin-film magnetic head of this embodiment has a structure in which a portion of the second layer $14B_2$ of the yoke portion layer 14B of the third embodiment, the portion being adjacent to the top surface of the pole portion layer 14A via the non-magnetic layer 15, is eliminated. In this embodiment, the protective layer 17A made of a non-conductive and non-magnetic material such as alumina is provided around the second layer $14B_2$. The vicinity of part of the surface of the second layer $14B_2$ farther from the gap layer 9, the part being magnetically connected to the pole portion layer 14A at the rear end surface of the pole portion layer 14A and the side surfaces of the pole portion layer 14A in the width direction, is flattened together with the surface of the non-magnetic layer 15 farther from the gap layer 9, and with the top surface of the protective layer 17A. On these flattened surfaces, provided is the protective layer 17B as in the second embodiment. The structure of the thin-film magnetic head of this embodiment is otherwise the same as that of the head of the third embodiment.

The method of manufacturing the thin-film magnetic head of this embodiment will now be described. The method employs the same steps as those of the third embodiment up to the step of forming the second layer $14B_2$ of the yoke portion layer 14B as shown in FIG. 29.

In this embodiment, the protective layer 17A is then formed to cover the non-magnetic layer 15 and the second layer $14B_2$. Then, the protective layer 17A is polished through chemical mechanical polishing, for example, to expose the non-magnetic layer 15, and, at least the vicinity of part of the surface of the second layer $14B_2$ farther from the gap layer 9, the part being magnetically connected to the pole portion layer 14A, is flattened together with the surface of the non-magnetic layer 15 farther from the gap layer 9 and with the top surface of the protective layer 17A. In FIG. 30, only part of the surface of the second layer $14B_2$ farther from the gap layer 9 is exposed from the protective layer 17A. However, this surface of the second layer $14B_2$ may be entirely exposed from the protective layer 17A. Then, as shown in FIG. 30, the protective layer 17B is formed over the entire surface. Then, through the steps of forming leads, terminals and the like on the protective layer 17B, cutting the substrate for each slider, polishing the medium facing surface ABS, preparing rails for flying and so on, the thin-film magnetic head is completed.

In this embodiment, as described above, at least the vicinity of part of the surface of the second layer $14B_2$ of the yoke portion layer 14B farther from the gap layer 9, the part being magnetically connected to the pole portion layer 14A, is flattened together with the surface of the non-magnetic layer 15 farther from the gap layer 9. Accordingly, it is possible to increase the percentage of the component of the magnetic field in the direction perpendicular to the surface of the recording medium, generated from the magnetic pole portion.

The other functions and effects of the head of this embodiment are the same as those of the head of the third embodiment except for the differences resulting from the following structural difference: in the third embodiment the second layer $14B_2$ of the yoke portion layer 14B is magnetically connected to the top surface of the pole portion layer 14A via the non-magnetic layer 15, but not in this embodiment.

The invention is not limited to the aforementioned embodiments but may be modified in a variety of ways. In the aforementioned embodiments, for example, the yoke portion layer 14B is magnetically connected to the rear end surface of the pole portion layer 14A and the side surfaces of the pole portion layer 14A in the width direction. However, the yoke portion layer 14B may be magnetically connected only to either the rear end surface of the pole portion layer 14A or the side surfaces thereof in the width direction.

In the invention, it is satisfactory if at least part of the connection surface of the pole portion layer 14A is inclined relative to the direction perpendicular to the surface of the pole portion layer 14A that faces the gap layer. This means that the connection surface may be curved, for example. In this case, the angles $\theta_1$ and $\theta_2$ at the points $c_1$ and $c_2$, respectively, may each be 90°. For the case where the connection surface is curved, "a cross section containing the at least part of the connection surface" refers to a cross section that contacts the at least part of the connection surface. The same holds true for the shape of the pole portion layer 14A in the medium facing surface.

The invention is applicable to not only a thin-film magnetic head for use with the vertical magnetic recording scheme but also to a thin-film magnetic head for use with the longitudinal magnetic recording scheme. A thin-film magnetic head for the longitudinal magnetic recording scheme has a thin gap layer, and therefore the magnetic flux is likely to leak from the gap-layer-side edges of the pole portion layer into the gap layer. As a result, the magnetic field to be applied to the recording medium may be weakened. On the other hand, the pole portion layer is required to be large in volume in order that the pole portion layer can efficiently absorb the magnetic field from the yoke portion layer. As in the invention, if the connection surface of the pole portion layer is inclined at an angle of more than 90° relative to the surface of the pole portion layer that faces the gap layer, it is possible to increase the volume of the pole portion layer without increasing the area of the surface of the pole portion layer that faces the gap layer. That is, it is possible to allow the pole portion layer to efficiently absorb the magnetic field from the yoke portion layer while suppressing the leakage of the magnetic flux from the pole portion layer into the gap layer.

As have been described, in the thin-film magnetic head of the invention, the second magnetic layer has the pole portion layer and the yoke portion layer. It is therefore possible to reduce the track width without decreasing the intensity of the magnetic field to be applied to the recording medium. Furthermore, according to the invention, at least part of the connection surface of the pole portion layer is inclined relative to the direction perpendicular to the surface of the pole portion layer that faces the gap layer. This makes the connection surface larger in area as compared with the case where the connection surface is perpendicular to the surface of the pole portion layer that faces the gap layer. The magnetic flux is therefore efficiently introduced from the yoke portion layer into the pole portion layer through the connection surface. As a result, the invention makes it possible to increase the intensity of the magnetic field generated from the magnetic pole portion in the direction perpendicular to the surface of the recording medium, and to increase the recording density.

In the thin-film magnetic head of the invention, at least part of the connection surface may be inclined at an angle of more than 90° relative to the surface of the pole portion layer that faces the gap layer. In this case, when the yoke portion layer is magnetically connected to the pole portion layer at the surface of the pole portion layer farther from the gap layer as well, a greater area is achieved for the portion at which the pole portion layer and the yoke portion layer are magnetically connected to each other. This makes it possible to introduce the magnetic flux from the yoke portion layer to the pole portion layer more efficiently.

In the thin-film magnetic head of the invention, in a cross section containing the at least part of the connection surface, the yoke portion layer may be greater than the pole portion layer in thickness. In this case, it is possible to prevent the magnetic flux from being saturated in the yoke portion layer in the vicinity of the portion at which the pole portion layer and the yoke portion layer are connected to each other. Accordingly, the magnetic flux is efficiently introduced from the yoke portion layer to the pole portion layer through the connection surface. As a result, it is possible to increase the intensity of the magnetic field generated from the magnetic pole portion in the direction perpendicular to the surface of the recording medium.

In the thin-film magnetic head of the invention, the yoke portion layer may be magnetically connected to the pole portion layer further at the surface of the pole portion layer farther from the gap layer. In this case, a greater area is achieved for the portion at which the pole portion layer and the yoke portion layer are magnetically connected to each other. This makes it possible to introduce the magnetic flux from the yoke portion layer to the pole portion layer more efficiently.

The thin-film magnetic head of the invention may further comprise the non-magnetic layer that touches the entirety of the surface of the pole portion layer farther from the gap layer. In this case, it is possible to prevent this surface of the pole portion layer from being damaged during the manufacturing process of the head, and to keep the surface flat. Accordingly, the end of the pole portion layer farther from the gap layer is kept flat in the medium facing surface, and the magnetic field generated from the pole portion layer in the medium facing surface is made uniform in the direction intersecting the track. As a result, it is possible to prevent the bit pattern of the recording medium from being distorted in shape, and to thereby improve the linear recording density.

In the thin-film magnetic head of the invention, the vicinity of part of the surface of the yoke portion layer farther from the gap layer, the part being magnetically connected to the pole portion layer at least in part of: the end surface of the pole portion layer farther from the medium facing surface; and the side surfaces of the pole portion layer in the width direction, may be flattened together with the surface of the non-magnetic layer farther from the gap layer. In this case, it is possible to increase the percentage of the component of the magnetic field in the direction perpendicular to the surface of the recording medium, generated from the magnetic pole portion.

In the thin-film magnetic head of the invention, the yoke portion layer may be magnetically connected to the pole portion layer further at the surface of the pole portion layer that faces the gap layer. In this case, a greater area is achieved for the portion at which the pole portion layer and the yoke portion layer are magnetically connected to each other, and it is therefore possible to introduce the magnetic flux from the yoke portion layer to the pole portion layer more efficiently.

In the thin-film magnetic head of the invention, the pole portion layer may have a saturated magnetic flux density equal to or greater than that of the yoke portion layer. In this case, it is possible to prevent the magnetic flux from being saturated halfway through the second magnetic layer.

The thin-film magnetic head of the invention may further comprise a magnetoresistive element as a read element. In this case, read performance is improved as compared with the case where reading is performed by using an induction-type electromagnetic transducer.

The thin-film magnetic head of the invention may be employed for a vertical magnetic recording scheme. In this case, it is possible to make the thin-film magnetic head impervious to heat fluctuations of the recording medium, and to thereby increase the linear recording density.

In the method of manufacturing the thin-film magnetic head of the invention, the second magnetic layer is formed to have the pole portion layer and the yoke portion layer. This makes it possible to reduce the track width without decreasing the intensity of the magnetic field to be applied to the recording medium. Furthermore, according to the invention, at least part of the connection surface of the pole portion layer is inclined relative to the direction perpendicular to the surface of the pole portion layer that faces the gap layer. This makes the connection surface larger in area as compared with the case where the connection surface is perpendicular to the surface of the pole portion layer that faces the gap layer. The magnetic flux is therefore efficiently introduced from the yoke portion layer into the pole portion layer through the connection surface. As a result, the invention makes it possible to increase the intensity of the magnetic field generated from the magnetic pole portion in the direction perpendicular to the surface of the recording medium, and to increase the recording density.

In the method of the invention, at least part of the connection surface may be inclined at an angle of more than 90° relative to the surface of the pole portion layer that faces the gap layer. In this case, when the yoke portion layer is magnetically connected to the pole portion layer at the surface of the pole portion layer farther from the gap layer as well, a greater area is achieved for the portion at which the pole portion layer and the yoke portion layer are magnetically connected to each other. This makes it possible to introduce the magnetic flux from the yoke portion layer to the pole portion layer more efficiently.

In the method of the invention, in a cross section containing the at least part of the connection surface, the yoke portion layer may be greater than the pole portion layer in thickness. In this case, it is possible to prevent the magnetic flux from being saturated in the yoke portion layer in the vicinity of the portion at which the pole portion layer and the yoke portion layer are connected to each other. Accordingly, the magnetic flux is efficiently introduced from the yoke portion layer to the pole portion layer through the connection surface. As a result, it is possible to increase the intensity of the magnetic field generated from the magnetic pole portion in the direction perpendicular to the surface of the recording medium.

In the method of the invention, the yoke portion layer may be magnetically connected to the pole portion layer further at the surface of the pole portion layer farther from the gap layer. In this case, a greater area is achieved for the portion at which the pole portion layer and the yoke portion layer are magnetically connected to each other. This makes it possible to introduce the magnetic flux from the yoke portion layer to the pole portion layer more efficiently.

The method of the invention may further comprise the step of forming the non-magnetic layer that touches the entirety of the surface of the pole portion layer farther from the gap layer. In this case, it is possible to prevent this surface of the pole portion layer from being damaged during the manufacturing process of the head, and to keep the surface flat. Accordingly, the end of the pole portion layer farther from the gap layer is kept flat in the medium facing surface, and the magnetic field generated from the pole portion layer in the medium facing surface is made uniform in the direction intersecting the track. As a result, it is possible to prevent the bit pattern of the recording medium from being distorted in shape, and to thereby improve the linear recording density.

In the method of the invention, the vicinity of part of the surface of the yoke portion layer farther from the gap layer, the part being magnetically connected to the pole portion layer at least in part of: the end surface of the pole portion layer farther from the medium facing surface; and the side surfaces of the pole portion layer in the width direction, may be flattened together with the surface of the non-magnetic layer farther from the gap layer. In this case, it is possible to increase the percentage of the component of the magnetic field in the direction perpendicular to the surface of the recording medium, generated from the magnetic pole portion.

In the method of the invention, the yoke portion layer may be magnetically connected to the pole portion layer further at the surface of the pole portion layer that faces the gap layer. In this case, a greater area is achieved for the portion at which the pole portion layer and the yoke portion layer are magnetically connected to each other, and it is therefore possible to introduce the magnetic flux from the yoke portion layer to the pole portion layer more efficiently.

In the method of the invention, the pole portion layer may have a saturated magnetic flux density equal to or greater than that of the yoke portion layer. In this case, it is possible to prevent the magnetic flux from being saturated halfway through the second magnetic layer.

Obviously many modifications and variations of the present invention are possible in the light of the above teachings. It is therefore to be understood that within the range of equivalency of the appended claims the present invention may be carried out otherwise than as specifically described.

What is claimed is:

1. A thin-film magnetic head comprising:
   a medium facing surface that faces toward a recording medium;
   a first magnetic layer and a second magnetic layer that are magnetically coupled to each other at a distance from the medium facing surface, and include magnetic pole portions disposed to oppose each other with a predetermined spacing interposed therebetween along the traveling direction of the recording medium;
   a gap layer made of a non-magnetic material and provided between the first and second magnetic layers; and
   a thin-film coil at least part of which is disposed between the first and second magnetic layers and insulated from the first and second magnetic layers, wherein:
   the second magnetic layer has: a pole portion layer including the magnetic pole portion, the width of the pole portion layer measured in the medium facing surface defining a track width; and a yoke portion layer for magnetically connecting the pole portion layer and the first magnetic layer to each other,
   the yoke portion layer is magnetically connected to the pole portion layer at least in part of: an end surface of the pole portion layer farther from the medium facing surface; and side surfaces of the pole portion layer in the width direction,
   the pole portion layer further has a connection surface that is magnetically connected to the yoke portion layer, the connection surface being at least part of: the end surface of the pole portion layer away from the medium facing surface; and the side surfaces of the pole portion layer in the width direction, and
   at least part of the connection surface is inclined relative to the direction perpendicular to a surface of the pole portion layer that faces the gap layer.

2. A thin-film magnetic head according to claim 1, wherein the at least part of the connection surface is inclined at an angle of more than 90° relative to the surface of the pole portion layer that faces the gap layer.

3. A thin-film magnetic head according to claim 1, wherein, in a cross section containing the at least part of the connection surface, the yoke portion layer is greater than the pole portion layer in thickness.

4. A thin-film magnetic head according to claim 1, wherein the yoke portion layer is additionally magnetically connected to the pole portion layer at a surface of the pole portion layer away from the gap layer.

5. A thin-film magnetic head according to claim 4, further comprising a non-magnetic layer that touches the surface of the pole portion layer away from the gap layer,
   wherein the yoke portion layer is adjacent to the surface of the pole portion layer away from the gap layer via the non-magnetic layer, and magnetically connected to the pole portion layer via the non-magnetic layer.

6. A thin-film magnetic head according to claim 1, further comprising a non-magnetic layer that touches the entirety of a surface of the pole portion layer away from the gap layer.

7. A thin-film magnetic head according to claim 6, wherein: a surface of the yoke portion layer away from the gap layer includes a part located near the connection surface, and the part is flattened together with a surface of the non-magnetic layer away from the gap layer.

8. A thin-film magnetic head according to claim 1, wherein the yoke portion layer is additionally magnetically connected to the pole portion layer at the surface of the pole portion layer that faces the gap layer.

9. A thin-film magnetic head according to claim 1, wherein the pole portion layer has a saturated magnetic flux density equal to or greater than that of the yoke portion layer.

10. A thin-film magnetic head according to claim 1, further comprising a magnetoresistive element as a read element.

11. A thin-film magnetic head according to claim 1, being employed for a vertical magnetic recording scheme.

12. A thin-film magnetic head according to claim 1, wherein the connection surface is located farther from the medium facing surface than a medium-facing-surface-side end of the thin-film coil.

13. A method of manufacturing a thin-film magnetic head comprising: a medium facing surface that faces toward a recording medium; a first magnetic layer and a second magnetic layer that are magnetically coupled to each other at a distance from the medium facing surface, and include magnetic pole portions disposed to oppose each other with a predetermined spacing interposed therebetween along the traveling direction of the recording medium; a gap layer made of a non-magnetic material and provided between the first and second magnetic layers; and a thin-film coil at least a part of which is disposed between the first and second magnetic layers and insulated from the first and second magnetic layers, wherein the second magnetic layer has; a pole portion layer including the magnetic pole portion, the width of the pole portion layer measured at the medium facing surface defining a track width; and a yoke portion layer for magnetically connecting the pole portion layer and the first magnetic layer to each other, the method comprising the steps of:

forming the first magnetic layer;

forming the gap layer;

forming the thin-film coil; and forming the second magnetic layer having the pole portion layer and the yoke portion layer, such that:

the pole portion layer has a surface that faces the gap layer, the surface being entirely parallel to a surface of the first magnetic layer that faces the gap layer;

the yoke portion layer is magnetically connected to the pole portion layer at least in part of: an end surface of the pole portion layer from the medium facing surface; and side surfaces of the pole portion layer in the width direction, the pole portion layer further has a connection surface that is magnetically connected to the yoke portion layer, the connection surface being at least part of: the end surface of the pole portion layer away from the medium facing surface; and the side surfaces of the pole portion layer in the width direction, and at least part of the connection surface is inclined relative to the direction perpendicular to the surface of the pole portion layer that faces the gap layer.

14. A method of manufacturing a thin-film magnetic head according to claim 13, wherein the at least part of the connection surface is inclined at an angle of more than 90° relative to the surface of the pole portion layer that faces the gap layer.

15. A method of manufacturing a thin-film magnetic head according to claim 13, further comprising the step of forming a non-magnetic layer that touches a surface of the pole portion layer away from the gap layer, wherein the yoke portion layer is adjacent to the surface of the pole portion layer away from the gap layer via the non-magnetic layer, and magnetically connected to the pole portion layer via the non-magnetic layer.

16. A method of manufacturing a thin-film magnetic head according to claim 13, further comprising the step of forming a non-magnetic layer that touches a surface of the pole portion layer away from the gap layer, wherein the step of forming the second magnetic layer includes the steps of: forming at least a part of the yoke portion layer to be magnetically connected to the pole portion layer; forming a protective layer to cover the non-magnetic layer and the yoke portion layer; and polishing the protective layer to expose the non-magnetic layer, and then flattening a part of a surface of the yoke portion layer away from the gap layer, the part being located near the connection surface, together with a surface of the non-magnetic layer away from the gap layer;

wherein the step of forming at least the part of the yoke portion layer, the step of forming the protective layer, and the step of polishing the protective layer and then flattening the part of the surface of the yoke portion layer together with the surface of the non-magnetic layer are performed after the step of forming the non-magnetic layer.

17. A method of manufacturing a thin-film magnetic head according to claim 13, wherein the connection surface is located farther from the medium facing surface than a medium-facing-surface-side end of the thin-film coil.

* * * * *

UNITED STATES PATENT AND TRADEMARK OFFICE
CERTIFICATE OF CORRECTION

PATENT NO. : 6,728,064 B2
DATED : April 27, 2004
INVENTOR(S) : Yoshikazu Sato et al.

It is certified that error appears in the above-identified patent and that said Letters Patent is hereby corrected as shown below:

Column 6,
Line 32, delete "1616" and insert -- 16-16 --;
Line 45, delete "2121" and insert -- 21-21 --.

Column 13,
Line 56, delete "$T_y$" and insert -- $T_Y$ --.

Column 22,
Line 47, delete "14B1" and insert -- $14B_1$ --.

Column 29,
Line 61, delete "in" and insert -- at --.

Column 29,
Lines 64 and 65, insert -- the pole portion layer has a surface that faces the gap layer, the surface being entirely parallel to a surface of the first magnetic layer that faces the gap layer; --.
Line 67, delete "farther" and insert -- away --.

Column 30,
Line 10, delete "a" and insert -- the --.

Column 31,
Line 18, after "layer" insert -- away --.

Signed and Sealed this

Thirteenth Day of July, 2004

JON W. DUDAS
*Acting Director of the United States Patent and Trademark Office*